United States Patent
Sakai et al.

(10) Patent No.: US 10,015,746 B2
(45) Date of Patent: Jul. 3, 2018

(54) COMMUNICATION APPARATUS AND CONTROL METHOD THEREOF

(71) Applicant: CANON KABUSHIKI KAISHA, Tokyo (JP)

(72) Inventors: Tomoya Sakai, Kawasaki (JP); Kensuke Yasuma, Tokyo (JP); Kenichi Fujii, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/196,747

(22) Filed: Jun. 29, 2016

(65) Prior Publication Data
US 2017/0006546 A1 Jan. 5, 2017

(30) Foreign Application Priority Data
Jul. 2, 2015 (JP) .................. 2015-133927

(51) Int. Cl.
H04W 4/00 (2018.01)
H04W 52/02 (2009.01)
(Continued)

(52) U.S. Cl.
CPC ......... *H04W 52/0229* (2013.01); *H04W 4/12* (2013.01); *H04L 67/02* (2013.01); *Y02D 70/00* (2018.01); *Y02D 70/1262* (2018.01); *Y02D 70/142* (2018.01); *Y02D 70/144* (2018.01); *Y02D 70/162* (2018.01); *Y02D 70/166* (2018.01); *Y02D 70/168* (2018.01)

(58) Field of Classification Search
USPC ....................................... 455/575
See application file for complete search history.

(56) References Cited

U.S. PATENT DOCUMENTS

2012/0113471 A1* 5/2012 Shimada .......... G06F 17/30274
358/1.15
2014/0310777 A1* 10/2014 Truskovsky ........ H04L 63/0823
726/4
(Continued)

FOREIGN PATENT DOCUMENTS

JP 2014-146876 A 8/2014

OTHER PUBLICATIONS

Belshe, M., et al., "Hypertext Transfer Protocol Version 2 (HTTP/2)," Internet Engineering Task Force (IETF), May 2015, pp. 1-96, published by the Internet Engineering Steering Group (IESG), ISSN: 2070-1721.

Primary Examiner — Ganiyu A Hanidu
(74) Attorney, Agent, or Firm — Carter, Deluca, Farrell & Schmidt LLP

(57) ABSTRACT

A communication apparatus transmits identification information for identifying a push message to be transmitted to the communication apparatus to a relay apparatus by using the first transmission unit, receives, from the relay apparatus, a push message transmitted by the relay apparatus after the first transmission unit transmits the identification information to the relay apparatus, and performs a process for switching the operation mode of the communication apparatus from the first operation mode to the second operation mode lower than the first operation mode in power consumption after the first transmission unit transmits the identification information to the relay apparatus.

7 Claims, 18 Drawing Sheets

(51) Int. Cl.
*H04W 4/12* (2009.01)
*H04L 29/08* (2006.01)

(56) References Cited

U.S. PATENT DOCUMENTS

| | | |
|---|---|---|
| 2015/0229627 A1 | 8/2015 | Yasuma |
| 2015/0350820 A1* | 12/2015 | Son ..................... H04W 4/008 |
| | | 455/41.2 |
| 2016/0029311 A1* | 1/2016 | Wolkowicki ...... H04W 52/0216 |
| | | 370/311 |
| 2016/0373342 A1* | 12/2016 | Kolan .................... H04L 45/24 |

* cited by examiner

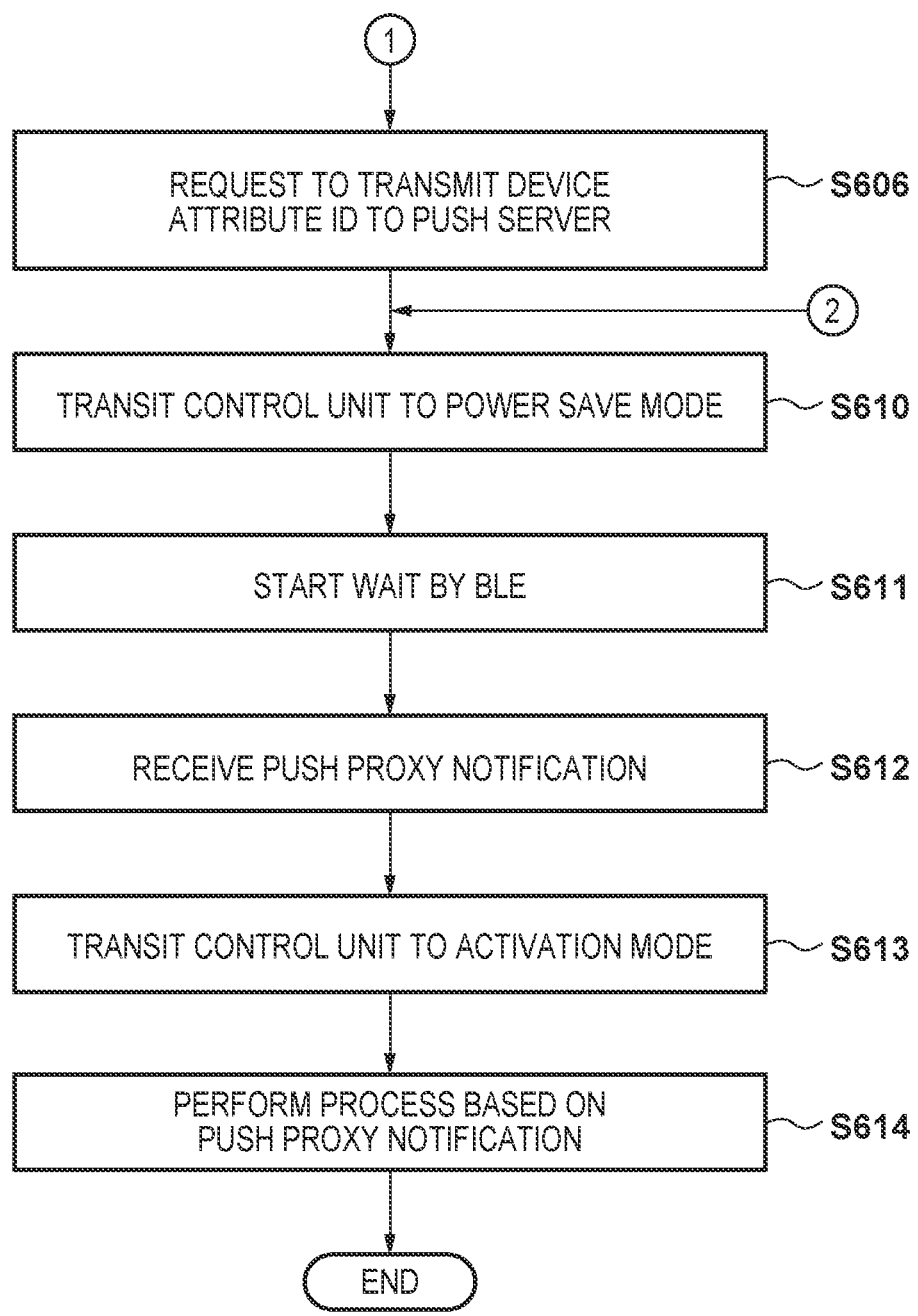

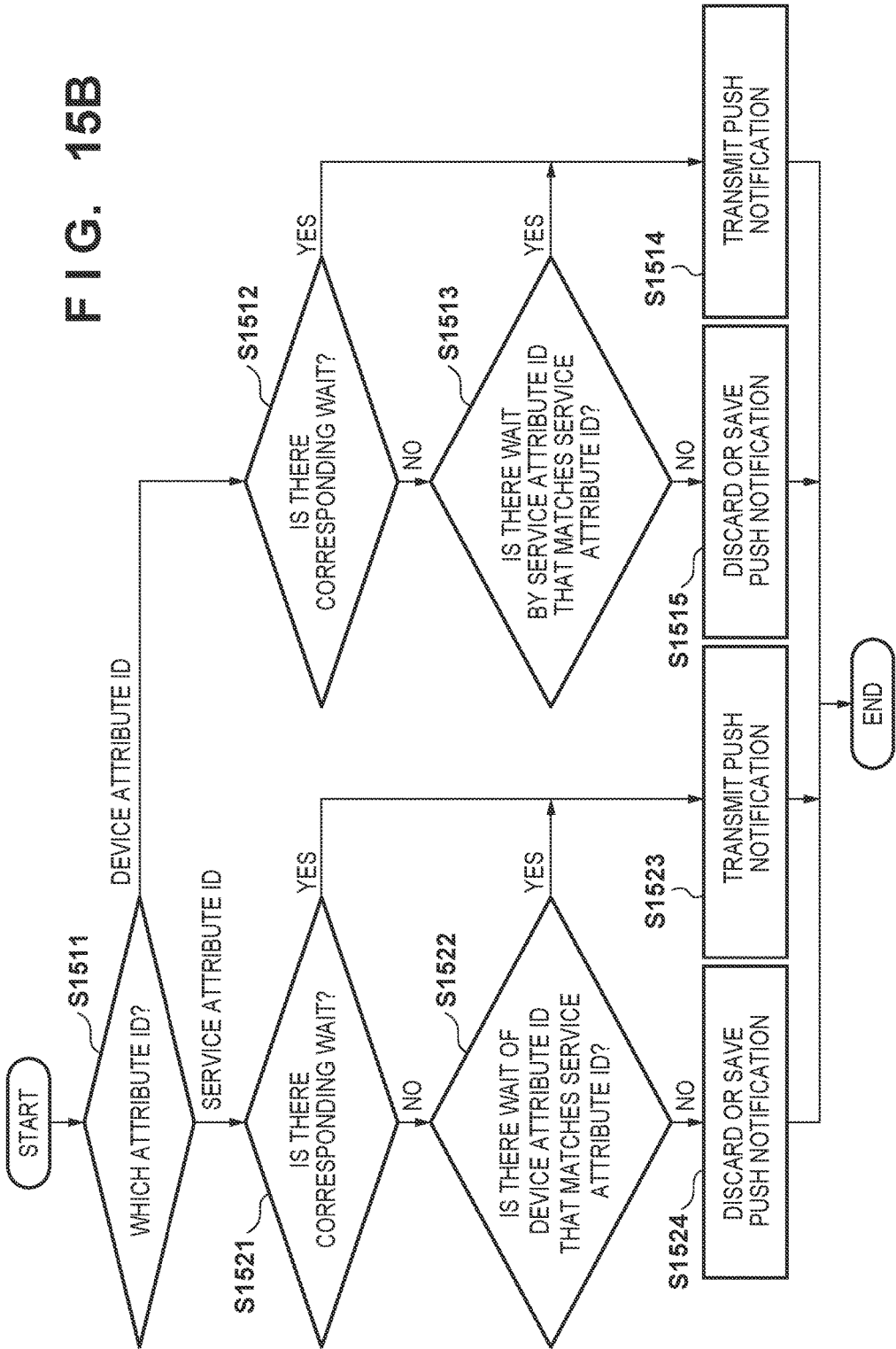

COMMUNICATION APPARATUS AND CONTROL METHOD THEREOF

BACKGROUND OF THE INVENTION

Field of the Invention

The present invention relates to a communication apparatus and a control method thereof.

Description of the Related Art

Recently, the speedup of HTTP/1.1 is required owing to the development in the Web. In the IETF (Internet Engineering Task Force), HTTP/2 as the next-generation standard of HTTP/1.1 is proposed (RFC7540). HTTP is also widely utilized in an embedded device other than a personal computer or a browser.

In various communication protocols including HTTP, a push notification is widely received. In general, when a client receives a push notification, the client needs to be connected to a push server all the time (Japanese Patent Laid-Open No. 2014-146876).

In an electronic apparatus driven by an internal battery, however, a battery driving time tends to be shorter when communication is utilized. In particular, in order for the client to receive the push notification in a communication protocol such as HTTP/2, the client needs to be connected to the push server all the time, making battery exhaustion (a reduction in a drivable time) more conspicuous. For example, when the client is an electronic apparatus such as a digital camera, power for maintaining communication in a permanent connection is consumed, in addition to power consumed for a shooting operation as a primary function.

SUMMARY OF THE INVENTION

An embodiment of the present invention provides a communication apparatus, a control method thereof, and a communication system capable of communicating a push notification in a power save state.

According to one aspect of the present invention, there is provided a communication apparatus comprising: a first transmission unit configured to transmit, to a relay apparatus, identification information for identifying a push message to be transmitted to the communication apparatus; a reception unit configured to receive, from the relay apparatus, a push message transmitted by the relay apparatus after the first transmission unit transmits the identification information to the relay apparatus; and a control unit configured to perform a process for switching an operation mode of the communication apparatus from a first operation mode to a second operation mode lower in power consumption than the first operation mode after the first transmission unit transmits the identification information to the relay apparatus.

According to another aspect of the present invention, there is provided a relay apparatus which relays a push message from a server apparatus to a communication apparatus, the relay apparatus comprising: a holding unit configured to hold identification information for identifying the push message addressed to the communication apparatus; a connection unit configured to connect to the communication apparatus by using a first communication unit; a first reception unit configured to wait for the push message from the server apparatus by using a second communication unit different from the first communication unit in at least a communication protocol; a determination unit configured to determine, based on the identification information held by the holding unit, whether the push message received by the first reception unit is the push message addressed to the communication apparatus; and a first transmission unit configured to transmit, if the determination unit determines that the push message received from the server apparatus by the reception unit is the push message addressed to the communication apparatus, the push message to the communication apparatus by using the first communication unit.

According to another aspect of the present invention, there is provided a communication apparatus which transmits a push message, the communication apparatus comprising: a registration unit configured to register, in association with each other, an HTTP path and a stream ID in HTTP/2 as identification information which specifies a service and a transmission destination of the push notification; and a transmission unit configured to obtain, from the registration unit, a stream ID registered in association with identification information designated by a push message of a subject for transmission and transmit the push message of the subject for transmission by a stream corresponding to the stream ID.

According to another aspect of the present invention, there is provided a control method of a communication apparatus comprising: transmitting, to a relay apparatus, identification information for identifying a push message to be transmitted to the communication apparatus by using a first transmission unit; receiving, from the relay apparatus, a push message transmitted by the relay apparatus after the first transmission unit transmits the identification information to the relay apparatus; and performing a process for switching an operation mode of the communication apparatus from a first operation mode to a second operation mode lower in power consumption than the first operation mode after the first transmission unit transmits the identification information to the relay apparatus.

According to another aspect of the present invention, there is provided a control method of a relay apparatus which relays a push message from a server apparatus to a communication apparatus, the method comprising: holding identification information for identifying a push message addressed to the communication apparatus; connecting to the communication apparatus by using a first communication unit; waiting for the push message from the server apparatus by using a second communication unit different from the first communication unit in at least a communication protocol; determining, based on the held identification information, whether a received push message is addressed to the communication apparatus; and transmitting, if the received push message is determined to be the push notification addressed to the communication apparatus, the push message to the communication apparatus by using the first communication unit.

According to another aspect of the present invention, there is provided a control method of a communication apparatus which transmits a push message, the method comprising: registering, in association with each other, an HTTP path and a stream ID in HTTP/2 as identification information which specifies a service and a transmission destination of the push message; and obtaining, from the registered stream ID, a stream ID registered in correspondence with identification information designated by a push message of a subject for transmission and transmitting the push message of the subject for transmission by a stream corresponding to the stream ID.

Further features of the present invention will become apparent from the following description of exemplary embodiments (with reference to the attached drawings).

BRIEF DESCRIPTION OF THE DRAWINGS

FIGS. 6A and 6B are a flowchart showing a process of receiving a push notification according to the embodiment;

FIGS. 15A and 15B are flowcharts showing an operation of a push server.

DESCRIPTION OF THE EMBODIMENTS

A communication apparatus and a communication system according to embodiments of the present invention will be described below in detail with reference to the accompanying drawings. Note that the following embodiments do not limit the present invention related to the scope of the claims, and all of combinations of characteristic features described in the embodiments are not indispensable for solution of the present invention.

First Embodiment

Figure 1:
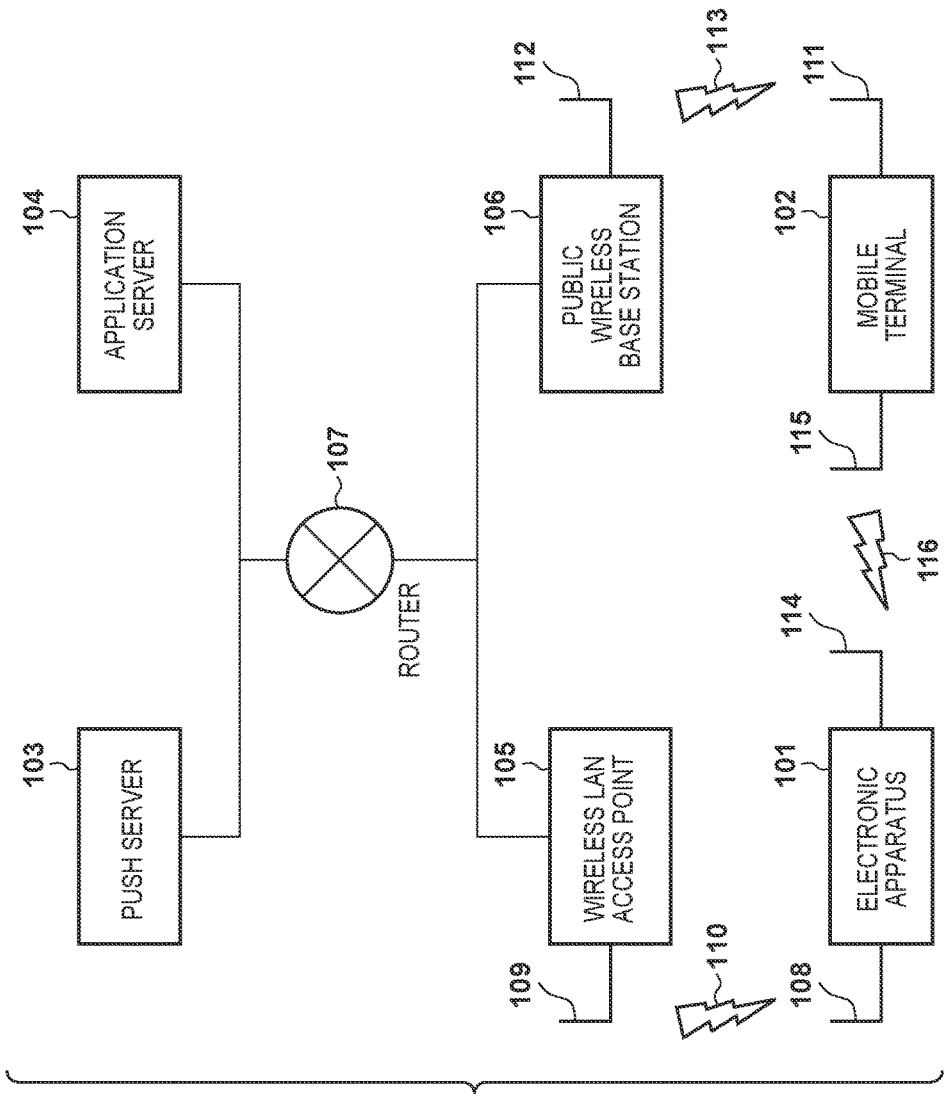
FIG. 1 is a block diagram showing an example of the arrangement of a communication system according to an embodiment.

FIG. 1 is a block diagram showing an example of the arrangement of a communication system. An electronic apparatus 101 is an example of an apparatus that can function as a communication apparatus such as a digital camera, a projector, a surveillance camera, a DTV (Digital TV), or a printer. The electronic apparatus 101 performs Internet communication via a network by a wireless or wired LAN. A mobile terminal 102 is an example of an apparatus that can function as a communication apparatus such as a smartphone or a tablet. The mobile terminal 102 includes, for example, LTE (Long Term Evolution) serving as public mobile communication and has a function capable of being connected to the Internet all the time even while moving. The mobile terminal 102 may be a web browser operating on the smartphone, the tablet, or the like, or may be applications installed in a communication device. In this embodiment, a description will be made by using the electronic apparatus 101 and the mobile terminal 102 as apparatuses each having a communication function. However, the presence/absence of portability or the like is not concerned.

A push server 103 functions as a server apparatus serving as the transmission source of a push notification. In this embodiment, the push server 103 is implemented by one PC. However, the push servers 103 may be arranged on a cloud in a distributed manner. An application server 104 provides Social Networking Service (SNS), cloud service, and the like. The application server 104 requests the push notification to the push server 103 when an event occurs. In this embodiment, the application server 104 is implemented by one PC. However, the application server 104 may be arranged on the cloud in the distributed manner. Further, in this embodiment, the push server 103 and the application server 104 are shown as separate arrangements. However, they may be formed integrally.

A wireless LAN access point 105 performs, for example, wireless communication complying with IEEE802.11 with a terminal. A public wireless base station 106 performs, for example, public wireless communication complying with 3GPP/LTE with the terminal. A router 107 has a function of bypassing Internet communication. Wireless LAN antennas 108 and 109 are configured to perform wireless LAN communication, and are used for communication by wireless LAN communication 110 between the electronic apparatus 101 and the wireless LAN access point 105. LTE antennas 111 and 112 perform public wireless communication, and are used for communication by public wireless (LTE 113 in this embodiment) between the mobile terminal 102 and the public wireless base station 106. BLE antennas 114 and 115 are used to perform direct communication by a short distance wireless scheme (for example, BLE 116) between the electronic apparatus 101 and the mobile terminal 102.

Note that BLE stands for Bluetooth® Low Energy. The short distance wireless scheme between the electronic apparatus 101 and the mobile terminal 102 is not limited to BLE. For example, a short distance wireless scheme such as ZigBee® or NFC (Near Field Communication) may be applied. The electronic apparatus 101 may be connected to the push server 103 or the application server 104 not only via a wireless LAN but also via the public wireless, the wired LAN, or the like. Further, the mobile terminal 102 may be connected to the push server 103 or the application server 104 not only via the public wireless but also via the wireless LAN, the wired LAN, or the like. Furthermore, the connection between the electronic apparatus 101 and the mobile terminal 102 is not limited to short distance wireless communication such as BLE, ZigBee, or NFC. For example, a USB, Wi-Fi, or the wired LAN or a combination thereof may be used for that connection.

Figure 2:
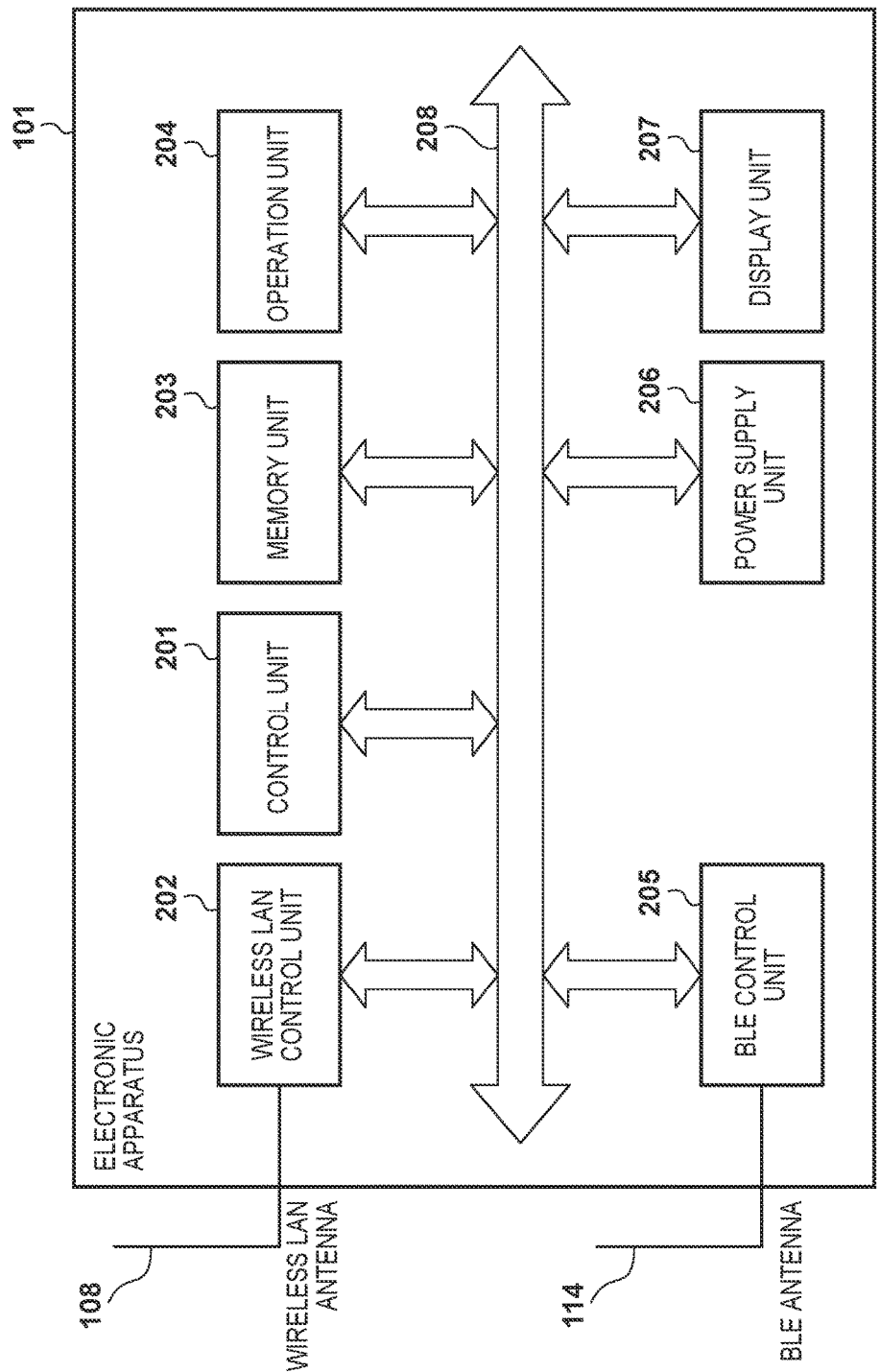
FIG. 2 is a block diagram showing an example of the hardware arrangement of an electronic apparatus according to the embodiment.

FIG. 2 is a block diagram showing an example of the hardware arrangement of the electronic apparatus 101. In FIG. 2, a control unit 201 comprehensively controls an operation in the electronic apparatus 101 and controls components 202 to 207 via a system bus 208. The wireless LAN control unit 202 controls wireless communication performed via the wireless LAN antenna 108. Note that the wireless LAN control unit may be an external device mounted by the USB or the like. The memory unit 203 stores and manages various data such as wireless communication network information, data transmission/reception information, a device attribute ID (to be described later), and a service attribute ID (to be described later). The operation unit 204 accepts an operation from a user. The BLE control unit 205 controls BLE communication performed via the BLE antenna 114. Note that the BLE control unit 205 may be an external device mounted by the USB or the like. The power supply unit 206 supplies a power supply voltage to the components 201 to 205 and 207. The power supply unit 206 can supply the power supply voltage to only a specific arrangement. For example, the power supply unit 206 performs a process (power save mode operation) of supplying the power supply voltage to only the BLE control unit 205 and not supplying it to the other components. The display unit 207 includes, for example, a liquid crystal panel and performs various display operations under control of the control unit 201.

Figure 4:
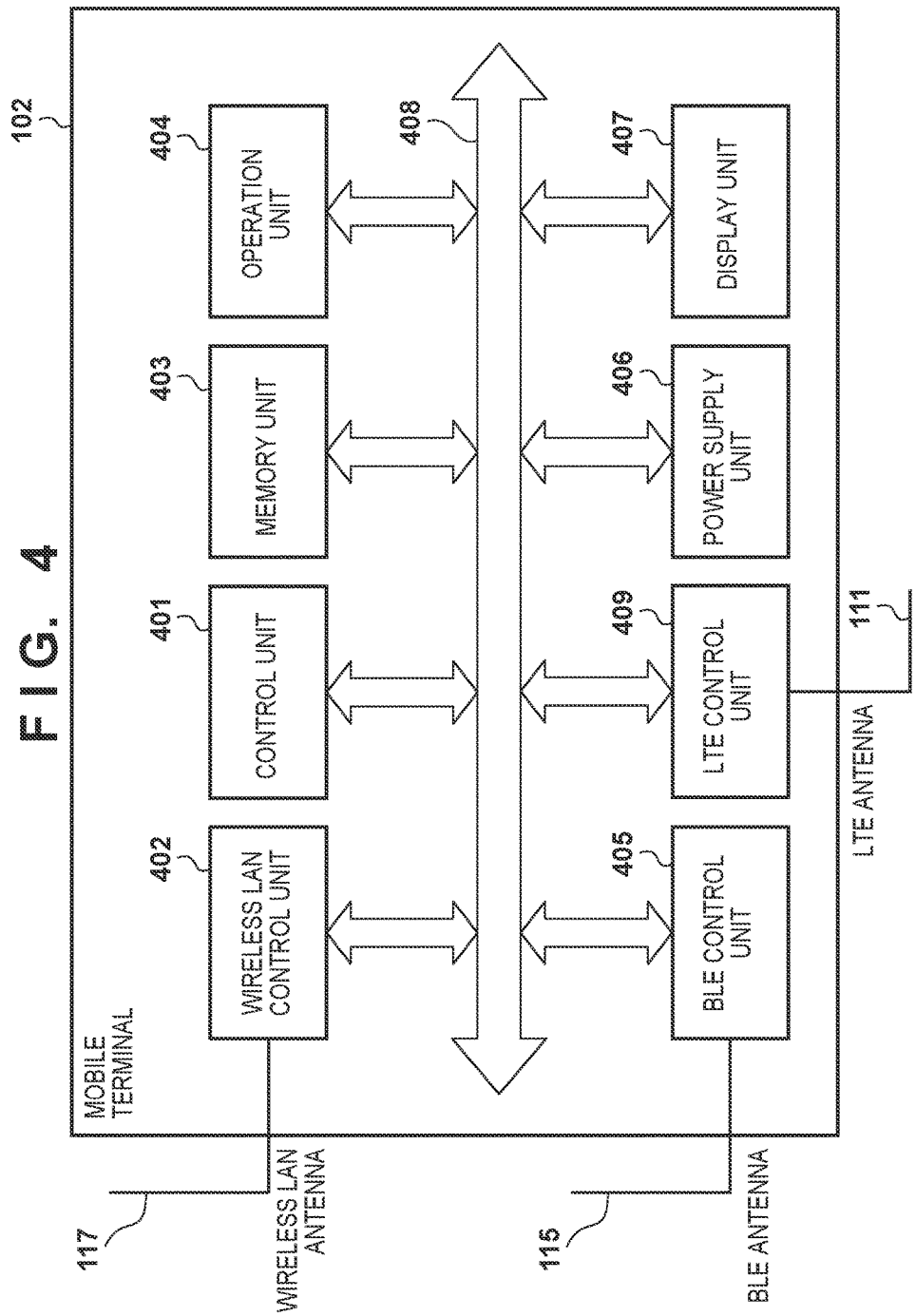
FIG. 4 is a block diagram showing an example of the hardware arrangement of a mobile terminal according to the embodiment.

FIG. 4 is a block diagram showing an example of the hardware arrangement of the mobile terminal 102. The arrangement denoted by reference numerals 401 to 408 in FIG. 4 has the same function as the arrangement denoted by reference numerals 201 to 208 in FIG. 2. An LTE control unit 409 controls LTE communication performed via the LTE antenna 111. Note that the LTE control unit 409 may be an external device mounted on the mobile terminal 102 by the USB or the like.

Note that the hardware arrangement of the push server 103 can be the same arrangement as that shown in FIG. 4. However, the BLE control unit 405 can be omitted.

Figure 3:
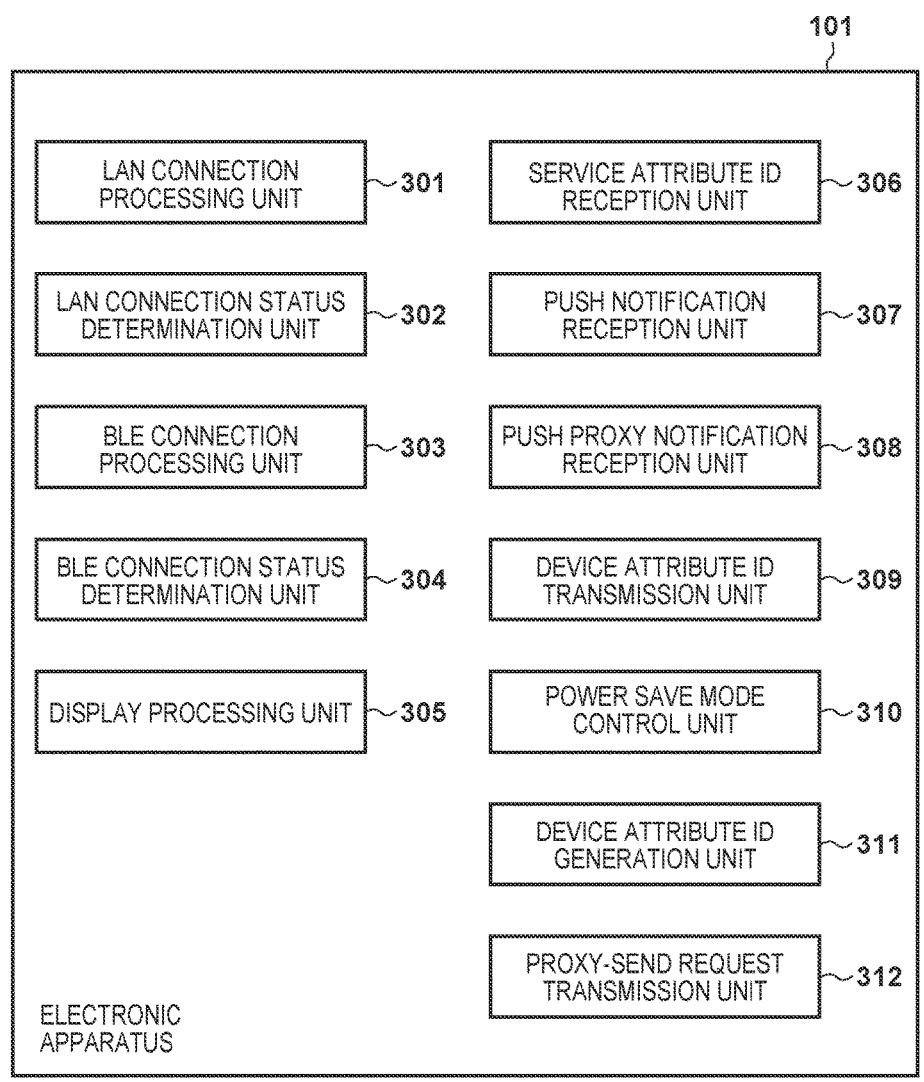
FIG. 3 is a block diagram showing an example of the functional arrangement of the electronic apparatus according to the embodiment.

FIG. 3 is a block diagram showing an example of the functional arrangement of the electronic apparatus 101. The functional block of the electronic apparatus 101 will be described below with reference to FIG. 3. Note that in this embodiment, the function of each functional block shown below is executed by causing a CPU (not shown) of the control unit 201 to perform software programs stored in a memory (not shown). However, some or all the functions included in the respective functional blocks may be implemented by hardware.

In FIG. 3, a LAN connection processing unit 301 controls wireless LAN communication via the wireless LAN control unit 202. A LAN connection status determination unit 302 determines whether there exists a wireless LAN access point connectable or being connected by the wireless LAN control unit 202 via the wireless LAN antenna 108. "Connection" here may refer to not only wireless connection but also setting a status capable of IP communication upon receiving an IP address or setting a status capable of application communication upon the completion of a discovery protocol. A BLE connection processing unit 303 controls BLE communication via the BLE control unit 205. A BLE connection status determination unit 304 determines whether there exists a partner performing BLE communication via the BLE control unit 205.

Upon receiving a push notification, a display processing unit 305 displays a message (hereinafter also referred to as push message) contained in the push notification on the display unit 207. A service attribute ID reception unit 306 receives a service attribute ID from the mobile terminal 102 via the BLE control unit 205. A push notification reception unit 307 receives a push notification from the push server 103 via the wireless LAN control unit 202 and performs a process based on the push notification. A push proxy notification reception unit 308 receives a push proxy notification from the mobile terminal 102 via the BLE control unit 205 and performs a process based on the push proxy notification. A device attribute ID transmission unit 309 transmits a device attribute ID to the mobile terminal 102 via the BLE control unit 205. The device attribute ID transmission unit 309 also transmits the device attribute ID to the push server 103 via the wireless LAN control unit 202.

A power save mode control unit 310 controls the power supply unit 206. The power save mode control unit 310 may control the execution status of a module or hardware such as the adjustment of a CPU clock or turn-off of a wireless chip. A device attribute ID generation unit 311 generates a device attribute ID. A proxy-send request transmission unit 312 transmits a proxy-send request of the device attribute ID to the mobile terminal 102 via the BLE control unit 205.

Figure 5:
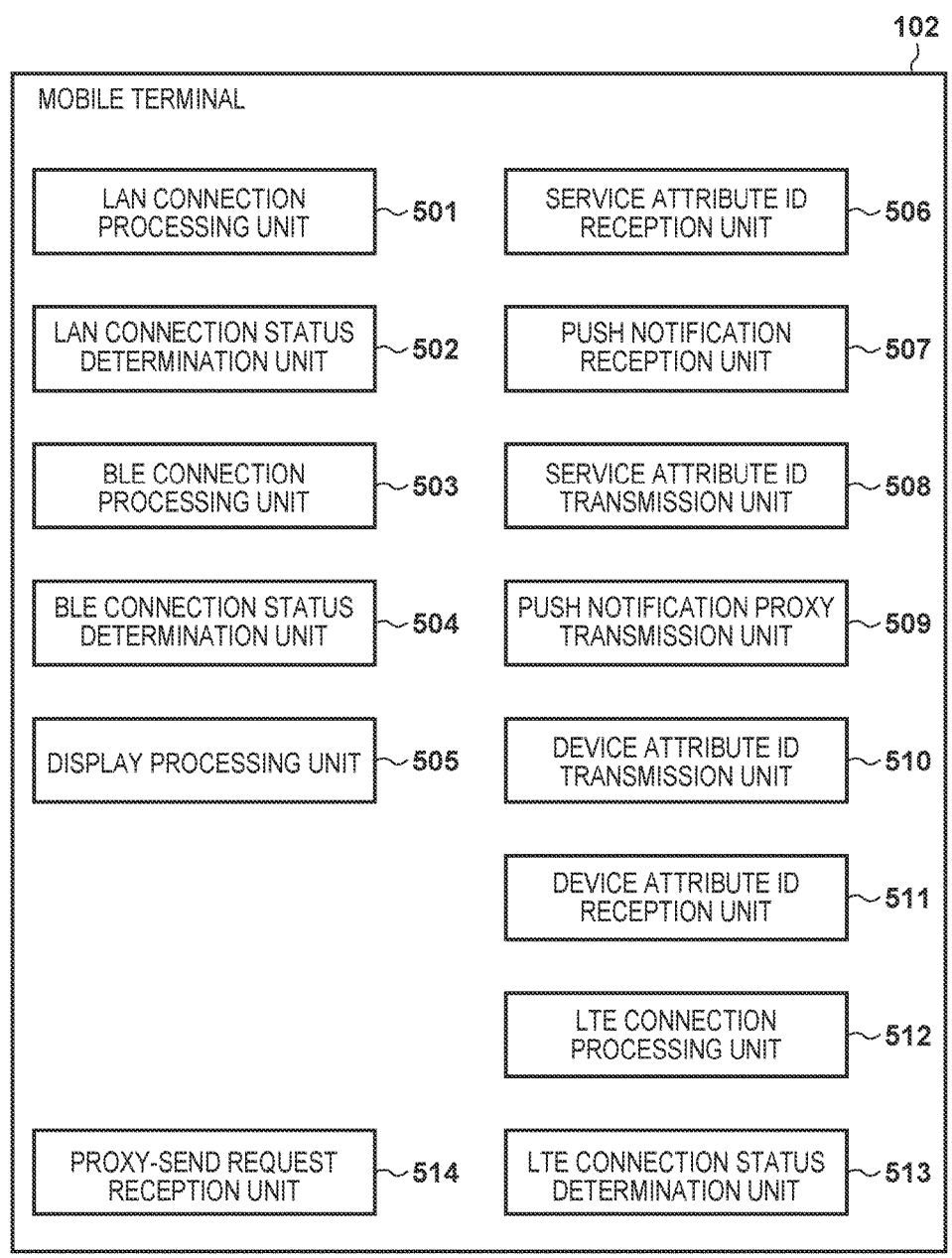
FIG. 5 is a block diagram showing an example of the functional arrangement of the mobile terminal according to the embodiment.

The functional arrangement of the mobile terminal 102 will now be described with reference to FIG. 5. FIG. 5 is a block diagram showing an example of the functional arrangement of the mobile terminal 102. Note that in this embodiment, the function of each functional block shown below is executed by causing a CPU (not shown) of the control unit 401 to perform software programs stored in a memory (not shown). However, some or all the functions included in the respective functional blocks may be implemented by hardware.

The arrangement denoted by reference numerals 501 to 505 and 507 in FIG. 5 has the same function as the arrangement denoted by reference numerals 301 to 305 and 307 in FIG. 3. A service attribute ID reception unit 506 receives a service attribute ID from the push server 103 via the LTE control unit 409 or the wireless LAN control unit 402. A service attribute ID transmission unit 508 transmits a service attribute ID to the electronic apparatus 101 (service attribute ID reception unit 306) via the BLE control unit 405. A push notification proxy transmission unit 509 transmits a push notification to the electronic apparatus 101 (push proxy notification reception unit 308) via the BLE control unit 405.

A device attribute ID transmission unit 510 transmits a device attribute ID to the push server 103 via the LTE control unit 409 or the wireless LAN control unit 402. A device attribute ID reception unit 511 receives the device attribute ID from the electronic apparatus 101 (device attribute ID transmission unit 309) via the BLE control unit 405. An LTE connection processing unit 512 is a control unit which controls LTE communication via the LTE control unit 409. An LTE connection status determination unit 513 determines whether there exists a connectable public wireless base station via the LTE control unit 409. In this embodiment, LTE is used as the public wireless standard. However, the present invention is not limited to this. A proxy-send request reception unit 514 receives the proxy-send request of the device attribute ID from the electronic apparatus 101 (proxy-send request transmission unit 312) via the BLE control unit 405.

Figure 14:
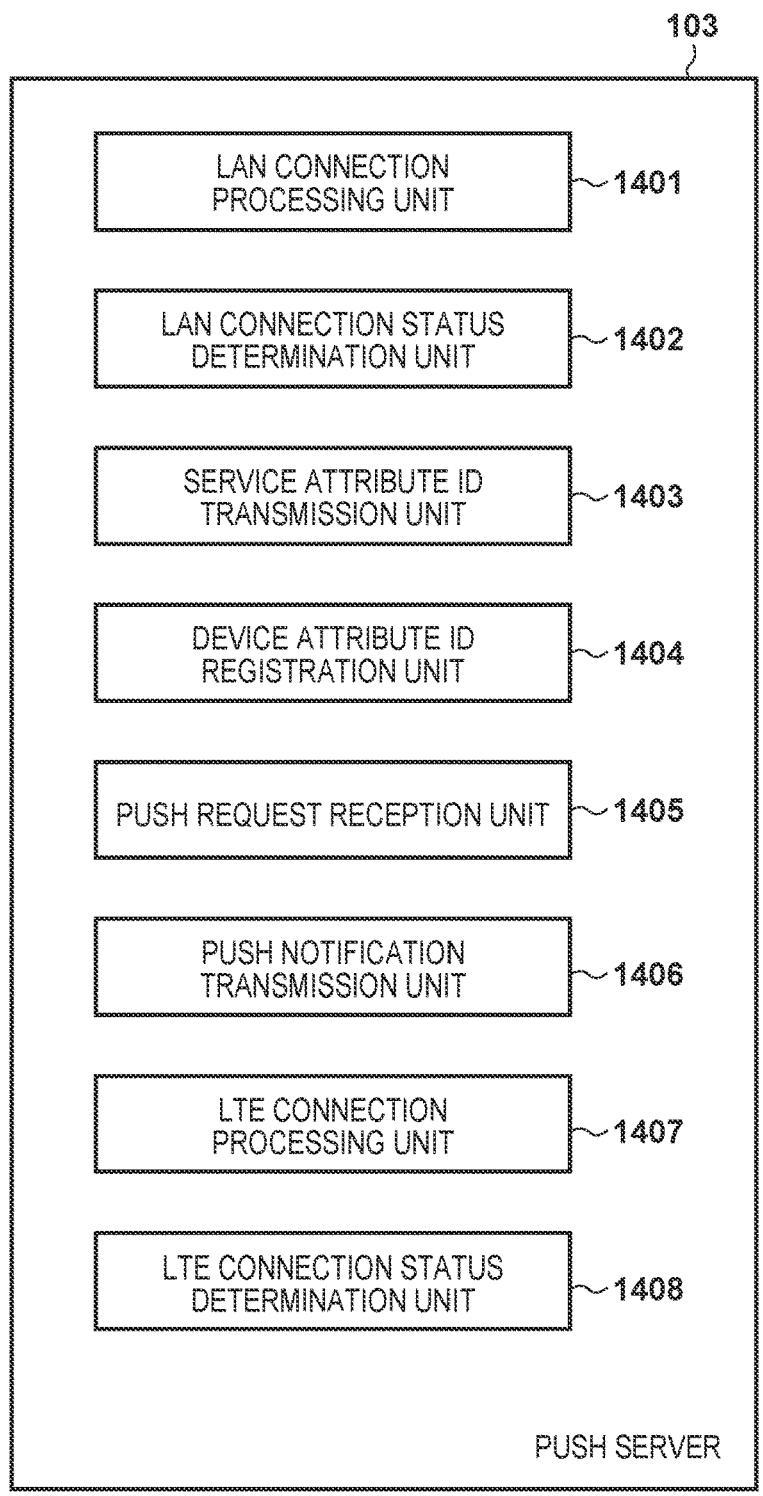
FIG. 14 is a block diagram showing an example of the functional arrangement of a push server.

The functional arrangement of the push server 103 will now be described with reference to FIG. 14. In FIG. 14, a LAN connection processing unit 1401, a LAN connection status determination unit 1402, an LTE connection processing unit 1407, and an LTE connection status determination unit 1408 are the same as the arrangements denoted by reference numerals 510, 502, 512, and 513 in FIG. 5. In response to a request from an external communication apparatus, a service attribute ID transmission unit 1403 transmits, by using the public wireless standard or the like, a service attribute ID containing the service attribute ID of the push notification provided by the application server 104. A device attribute ID registration unit 1404 receives a device attribute ID for the push notification from the external communication apparatus and registers the received ID. The device attribute ID is registered in association with information (for example, a transmission destination address) that specifies the transmission destination of the push notification. Note that, for example, a communication apparatus that has transmitted the device attribute ID or a communication apparatus designated as the transmission destination in a registration request of the device attribute ID is registered as the transmission destination of the push notification. A push request reception unit 1405 receives a push request from the application server 104. The push request contains the contents of the push notification and a device attribute ID (service attribute ID) that specifies a subject for push notification. A push notification transmission unit 1406 transmits the push notification to a transmission destination associated with the device attribute ID contained in the push request.

The operations of the electronic apparatus 101, the mobile terminal 102, and the push server 103 according to this embodiment each having the above-described arrangement will now be described. First, the reception operation of the push notification by the electronic apparatus 101 will be described in detail with reference to a flowchart of FIGS. 6A and 6B.

Figure 6A:
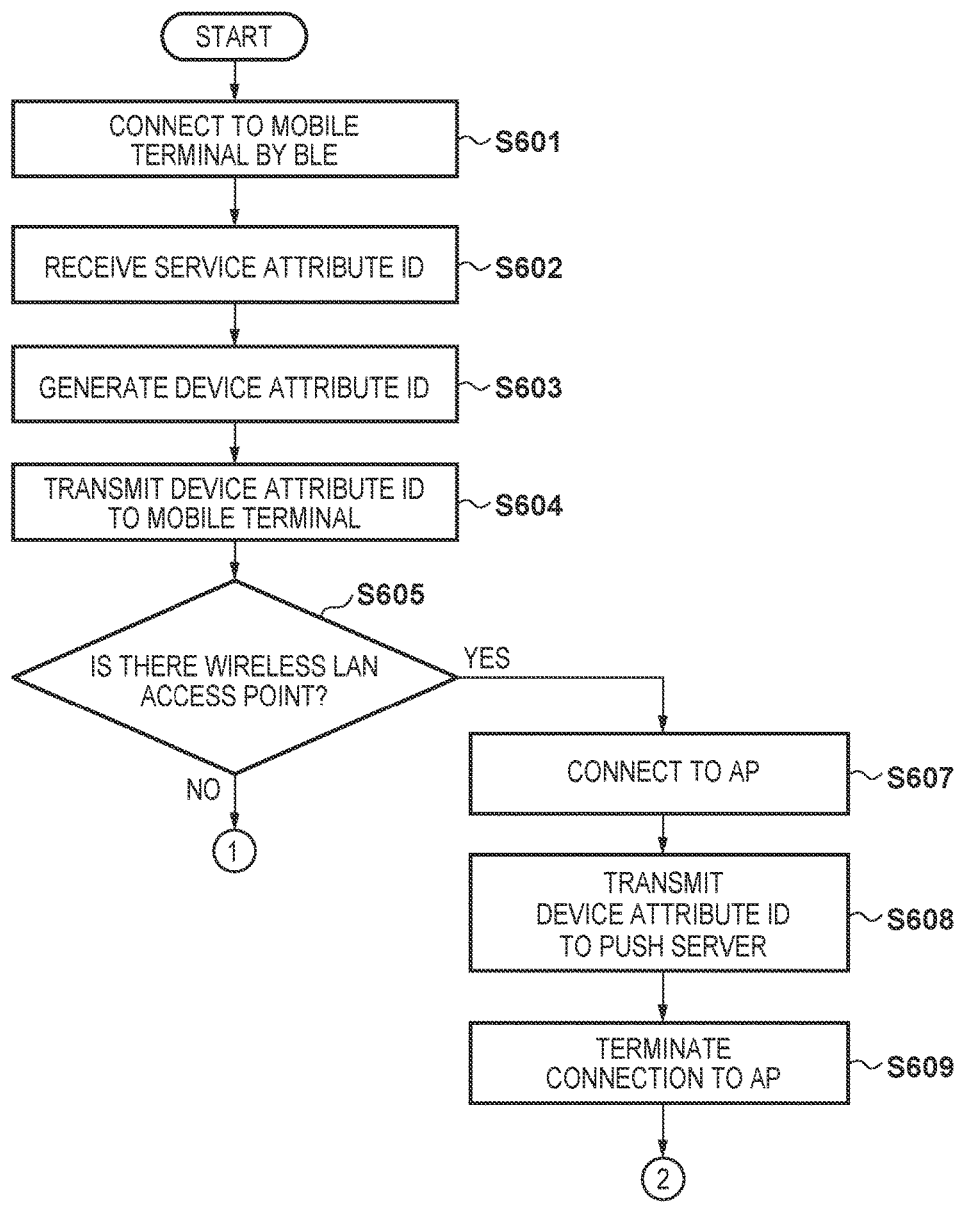

In FIGS. 6A and 6B, the BLE connection processing unit 303 is connected to the mobile terminal 102 via the BLE 116 and starts communication (step S601). When BLE communication is started, the service attribute ID reception unit 306 receives a service attribute ID from the mobile terminal 102 and stores the service attribute ID in the memory unit 203 to manage it (step S602). This service attribute ID represents an identifier linked with a service provided by the application server 104. This allows the electronic apparatus 101 or the mobile terminal 102 to judge from which service the push notification is issued. Similarly, the electronic apparatus 101 or the mobile terminal 102 can judge to which service the push message contained in the push notification is related by referring to the service attribute ID. In this embodiment, the electronic apparatus 101 receives the service attribute ID from the mobile terminal 102 (steps S701 to S703 in FIG. 7A). However, the present invention is not limited to this. For example, the electronic apparatus 101 may obtain the service attribute ID from the push server 103 or the application server 104, or may obtain it via a proxy server or the like.

Then, the device attribute ID generation unit 311 generates a device attribute ID that makes the electronic apparatus 101 uniquely identifiable for the push notification, and stores it in the memory unit 203 to manage it (step S603). In this embodiment, the device attribute ID is used as identification information for identifying the push notification that sets the electronic apparatus 101 as the communication apparatus to a subject for notification. The device attribute ID generation unit 311 is configured to generate the device attribute ID. However, the present invention is not limited to this. For example, the device attribute ID generation unit 311 may read a predetermined identifier from the electronic apparatus 101 or may obtain the device attribute ID from another apparatus (for example, the push server 103 or the like). Then, the device attribute ID transmission unit 309 transmits the device attribute ID to the mobile terminal 102 (step S604).

Note that in this embodiment, the device attribute ID is generated by adding a code (device identifier) which can uniquely identify the electronic apparatus 101 as the subject for notification to the service attribute ID. That is, the device attribute ID as the identification information is obtained by combining the service attribute ID that identifies the service and an identifier that identifies the electronic apparatus 101. For example, if the service attribute ID is "ID1", a device attribute ID "ID1/device" is generated by adding, for example, an identifier "/device" that specifies the electronic apparatus 101. The device attribute ID or the service attribute ID can specify the device or the service uniquely. For example, the format of the device attribute ID or the service attribute ID may be XML or JSON. The device identifier may be the UUID unique to the device, the physical address of BLE, the Cookie, or the MAC address, or a value (for example, a hash value) generated by utilizing some of them.

As described above, the mobile terminal 102, the push server 103, or the application server 104 may generate the device attribute ID. In this case, the electronic apparatus 101 obtains the device attribute ID from another device and stores it in the memory unit 203 to manage it. As described above, it is possible to judge a specific device for a specific service by the device attribute ID generated by the code which can uniquely identify the service attribute ID and the device.

Next, the LAN connection status determination unit 302 determines whether there is a connectable wireless LAN access point (step S605). If the LAN connection status determination unit 302 determines that there is the connectable wireless LAN access point (YES in step S605), the LAN connection processing unit 301 is connected to the wireless LAN access point (step S607). A description has been made here by taking the wireless LAN as an example. However, the present invention is not limited to this. For example, when the LAN connection processing unit 301 is connected to the access point by the wired LAN, the LAN connection status determination unit 302 may determine a connection status by performing, for example, a communication confirmation check of a network in accordance with whether an IP address is given to the self apparatus. For example, it is possible to use a communication confirmation check at an application level using SSDP, mDNS, WS-Discovery, or the like. The device attribute ID transmission unit 309 transmits the device attribute ID to the push server 103 via the wireless LAN control unit 202 (step S608). At this time, the mobile terminal 102 is designated as the transmission destination of a push notification corresponding to the device attribute ID. Then, the LAN connection processing unit 301 terminates connection to the wireless LAN access point (step S609).

On the other hand, if the LAN connection status determination unit 302 determines that there is no connectable wireless LAN access point (NO in step S605), the process advances to step S606. In this case, the proxy-send request transmission unit 312 transmits, by using the BLE 116, the proxy-send request of the device attribute ID to the mobile terminal 102 (proxy-send request reception unit 514) (step S606). Note that when the device attribute ID also needs to be managed in the application server 104 in order to link the push server 103 with the application server 104, the device attribute ID transmission unit 309 also transmits the device attribute ID to the application server 104. Alternatively, the push server 103 may transmit the device attribute ID to the application server 104.

Next, the power save mode control unit 310 transits the control unit 201 serving as a host CPU from a normal mode (first operation mode) in which the electronic apparatus 101 performs a normal operation to a power save mode (second operation mode) (step S610). The power save mode mentioned here represents, for example, a status in which the power supply unit 206 continues to supply power to at least the BLE control unit 205 and stops power supply to the other components. Note that the power save mode is not limited to this but, for example, may be a status in which some operations of hardware or software stop, or a status in which a clock of the CPU is slowed down. That is, the power save mode (second operation mode) is an operation mode lower than the normal mode (first operation mode) in power consumption.

Upon transiting to the power save mode as described above, the push proxy notification reception unit 308 starts to wait for the push notification by the BLE control unit 205 (step S611). In this wait status, the push proxy notification reception unit 308 receives the push notification from the mobile terminal 102 (push notification proxy transmission unit 509) via BLE (step S612). Upon receiving the push notification, the power save mode control unit 310 transits the control unit 201 to an activation mode (step S613) and restarts power supply to the respective components. Consequently, the electronic apparatus 101 transits from the power save mode to the normal mode in accordance with reception of the push notification. Then, the push proxy notification reception unit 308 performs a process based on the received push proxy notification (step S614). If there is a message to be displayed based on the received push notification, the display processing unit 305 displays it on the display unit 207.

Note that the push proxy notification reception unit 308 may receive, instead of a push message which is the contents of the push notification, a message (push notification message) which indicates that there has been the push notification. When the push proxy notification reception unit 308 receives the push notification message, the push notification reception unit 307 accesses the push server 103 via the wireless LAN access point 105 and receives the contents of the push notification. As described above, it is possible to receive the contents of the push notification with high throughput by using wireless LAN communication which is high in power consumption but faster than BLE which is low in power consumption but slow. In this case, for example, if the message size of the push notification received from the push server 103 is larger than a predetermined value, the mobile terminal 102 only notifies the electronic apparatus 101 of reception. This allows the electronic apparatus 101 to operate so as to receive the push notification via the BLE 116 if the message size is equal to or smaller than the predetermined value and to receive the push notification by using wireless LAN communication if the message size is larger than the predetermined value.

In this embodiment, the push proxy notification reception unit 308 waits for the push notification. However, the push notification reception unit 307 may wait for the push notification from the push server 103 under a predetermined condition. That is, under the predetermined condition, the power save mode control unit 310 may continue reception of the push notification by the push notification reception unit 307 without transiting the control unit 201 to the power save mode even when waiting for the push notification. Note that the predetermined condition includes, for example, a case in which the power supply unit 206 is connected to an AC adaptor or the like or operated by using a specific user interface, or a case in which there is a specific instruction by the characteristics of active applications or a user operation. This makes it possible to achieve both an immediate push notification and a power save push notification under the predetermined condition.

Figure 7A:
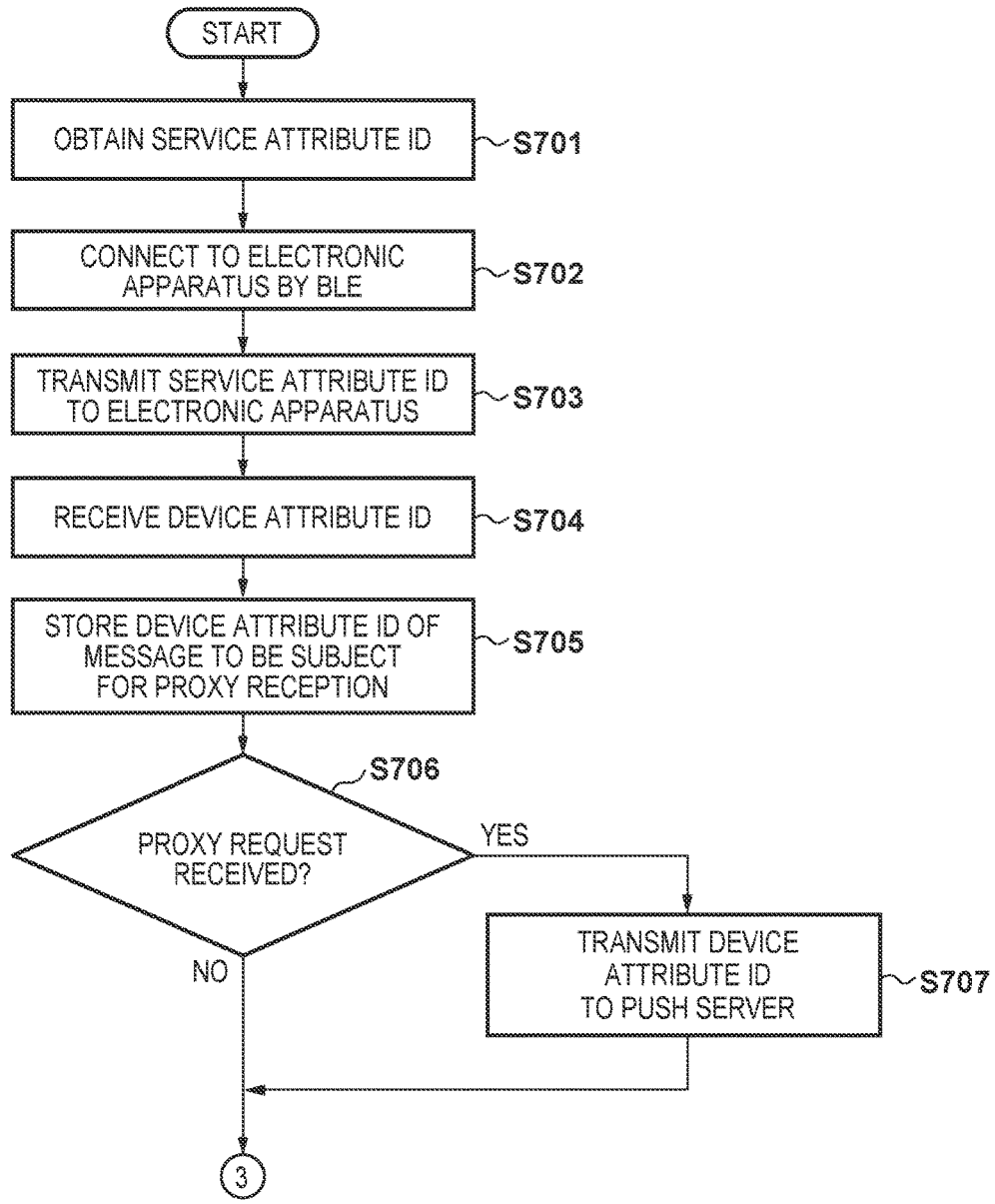
FIGS. 7A and 7B are a flowchart showing a process of relaying the push notification according to the embodiment.
Figure 7B:
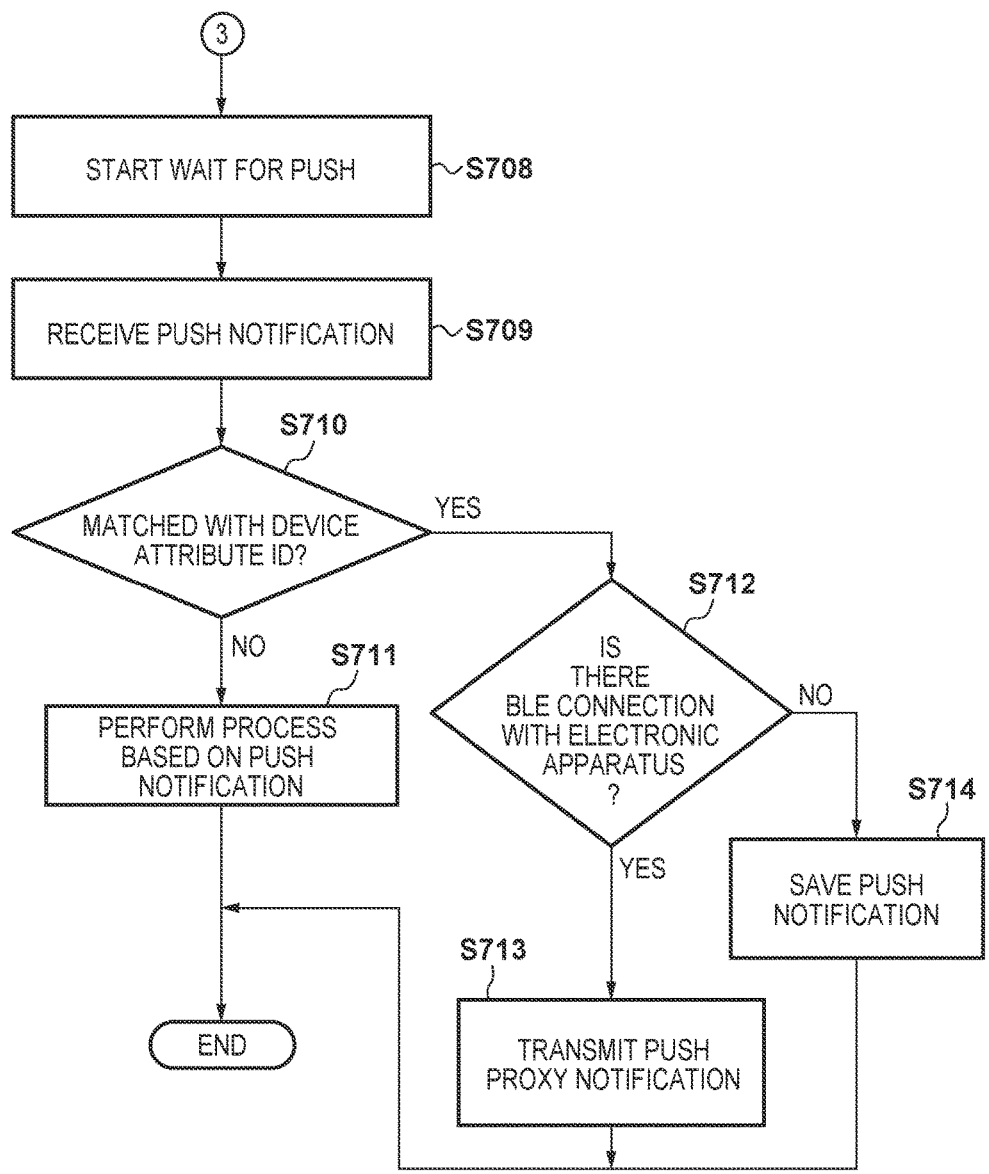

The operation of the mobile terminal 102 will now be described in detail with reference to a flowchart of FIGS. 7A and 7B. In FIGS. 7A and 7B, the service attribute ID reception unit 506 receives a service attribute ID from the push server 103 and stores it in the memory unit 403 to manage it (step S701). In this embodiment, the service attribute ID reception unit 506 obtains the service attribute ID from the push server 103. However, the service attribute ID reception unit 506 may obtain the service attribute ID by accessing the application server 104. Alternatively, the push server 103 may be instructed to obtain the service attribute ID from the application server 104. For example, if the mobile terminal 102 is the web browser, it is possible to obtain a web page provided by the application server 104 and obtain the service attribute ID by utilizing information such as Javascript contained in the web page.

The BLE connection processing unit 503 is connected to the electronic apparatus 101 via the BLE control unit 405 (step S702). The service attribute ID transmission unit 508 transmits the service attribute ID to the electronic apparatus 101 via the BLE 116 (step S703). The electronic apparatus 101 receives the transmitted service attribute ID (step S602). Note that when the electronic apparatus 101 obtains the service attribute ID from the push server 103 or the like, the process in steps S701 to S703 can be omitted. Next, the device attribute ID reception unit 511 receives a device attribute ID from the electronic apparatus 101 (step S604) (step S704) and stores, as a subject for push proxy notification, the received device attribute ID in the memory unit 403 to manage it (step S705). Consequently, identification information (device attribute ID) for specifying the push notification addressed to the electronic apparatus 101 is held in the mobile terminal 102. Note that in this embodiment, the device attribute ID is notified from the electronic apparatus 101 to the mobile terminal 102, thereby instructing the mobile terminal 102 to receive the push notification by proxy. Note that an instruction to execute proxy reception may be notified from the electronic apparatus 101 to the mobile terminal 102 separately.

The proxy-send request reception unit 514 determines whether the proxy-send request of the device attribute ID is received from the electronic apparatus 101 (step S706). The proxy-send request of the device attribute ID is transmitted from the electronic apparatus 101 as needed (step S606). If the proxy-send request reception unit 514 determines that the proxy-send request of the device attribute ID is received from the electronic apparatus 101 (YES in step S706), the device attribute ID transmission unit 510 transmits the device attribute ID received in step S704 to the push server 103 (step S707). At this time, the mobile terminal 102 is designated as the transmission destination of a push notification corresponding to the device attribute ID. Note that when the device attribute ID also needs to be managed in the application server 104 in order to link the push server 103 with the application server 104, the device attribute ID transmission unit 510 also transmits the device attribute ID to the application server 104. Alternatively, the push server 103 may transmit the device attribute ID to the application server 104. If the proxy-send request is not received, step S707 will be skipped.

Figure 8:
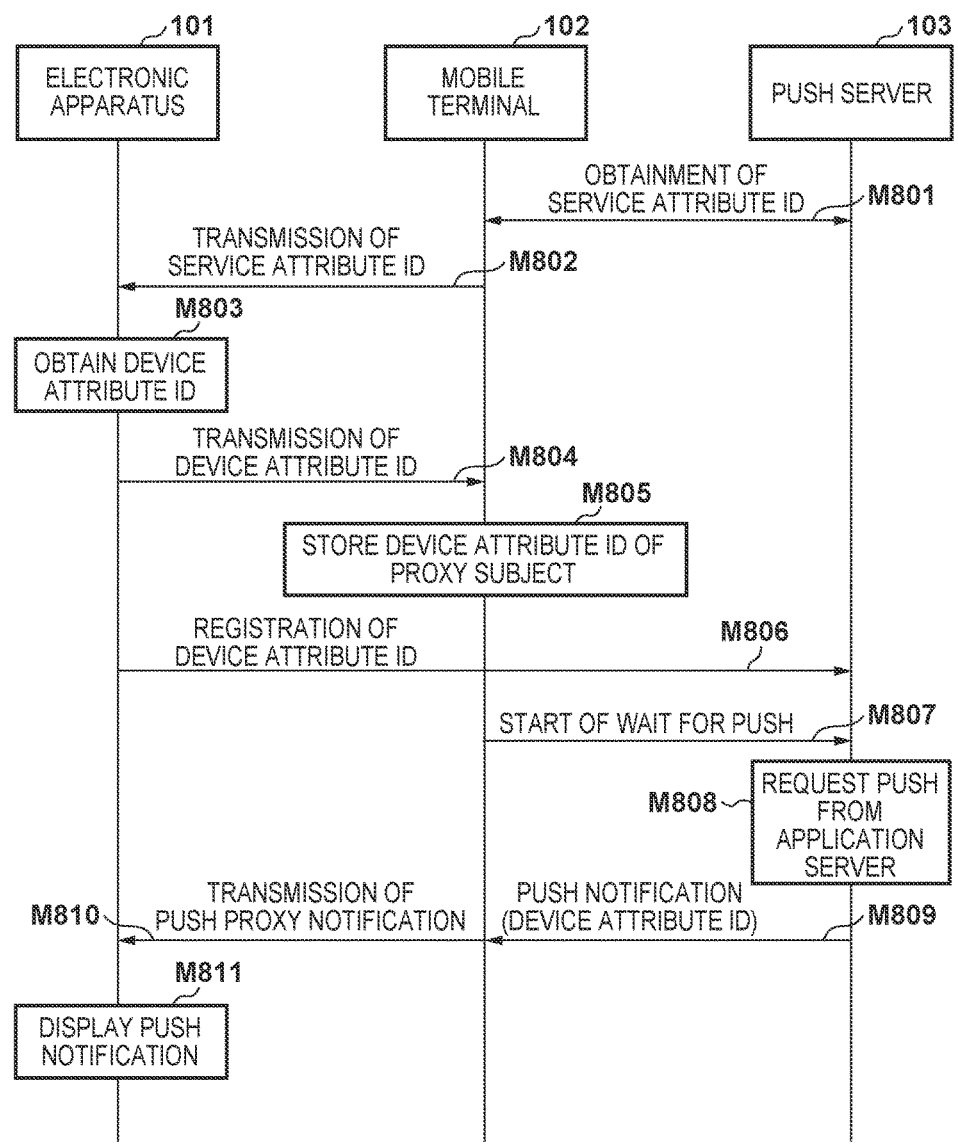
FIG. 8 is a chart showing an example of the sequence of a communication process according to the embodiment.

The push notification reception unit 507 starts to wait for the push notification and notifies the push server 103 of this as shown in M807 of FIG. 8 (step S708). Note that in communication between the push server 103 and the mobile terminal 102, a plurality of logical communication paths can be established on a single communication path. For example, if HTTP/2 is used as a protocol that receives a push notification, a plurality of devices, applications, or browsers can be subjects by using a plurality of streams on connection of one TCP. The push notification reception unit 507 receives the push notification from the push server 103 (step S709).

The push notification reception unit 507 judges whether a subject for push notification contained in the received push notification matches the device attribute ID in the memory unit 403 (step S710). That is, the push notification reception unit 507 compares the subject for push notification contained in the received push notification with the device attribute ID saved in the memory unit 403. Note that when waiting for the push notification by using HTTP/2, it is possible to judge the subject for push notification by checking a stream ID which has received the push notification or a stream associated with that stream.

If the push notification reception unit 507 judges that the subject for notification contained in the received push notification does not match the device attribute ID saved in step S705 (NO in step S710), the push notification reception unit 507 recognizes that the push notification is addressed to the self apparatus. In this case, the push notification reception unit 507 performs a process based on the received push notification (step S711). If there is a message to be displayed based on the received push notification, the display processing unit 505 displays it on the display unit 407.

On the other hand, if the push notification reception unit 507 judges that the subject for push notification matches the device attribute ID saved in the memory unit 403 (YES in step S710), the process advances to step S712. In this case, the BLE connection status determination unit 504 judges whether there is BLE connection with the communication apparatus (in this example, the electronic apparatus 101) specified by a target device attribute (step S712). If the BLE connection status determination unit 504 judges that there is the BLE connection with the target communication apparatus (YES in step S712), the push notification proxy transmission unit 509 transmits a push proxy notification to the target communication apparatus (step S713). In this embodiment, the push notification proxy transmission unit 509 transmits the push notification received by the push notification reception unit 507 to the electronic apparatus 101. Note that the push notification proxy transmission unit 509 may not transmit the push notification if it checks the contents of the push notification and judges that the push notification need not be transmitted.

Note that, as described above, the push notification proxy transmission unit 509 may transmit, instead of the push message about the contents of the push notification, the message which indicates that there has been the push notification. In this case, the push notification proxy transmission unit 509 may transmit the push notification if the message size is equal to or smaller than the predetermined value and may transmit the message which indicates that there has been the push notification if the message size is larger than the predetermined value.

If the BLE connection status determination unit 504 judges that there is no BLE connection with the target communication apparatus (NO in step S712), the push notification reception unit 507 saves the received push notification in the memory unit 403 (step S714). Then, the push notification proxy transmission unit 509 transmits the push proxy notification saved in the memory unit 403 once the BLE connection with the target device is established. As described above, the push notification proxy transmission unit 509 saves the push notification when communication by BLE cannot be performed with the subject (electronic apparatus 101) for push notification. This makes it possible, for example, even if the electronic apparatus 101 and the mobile terminal 102 are at a distance incapable of performing communication by BLE, to transmit the saved push notification when they come close to each other and BLE communication becomes possible. In this embodiment, only the BLE connection status is determined. However, the present invention is not limited to this. The BLE connection status determination unit 504 may further check whether there is connection by another communication system and utilize it to transmit the push notification to the electronic apparatus 101.

Figure 15A:
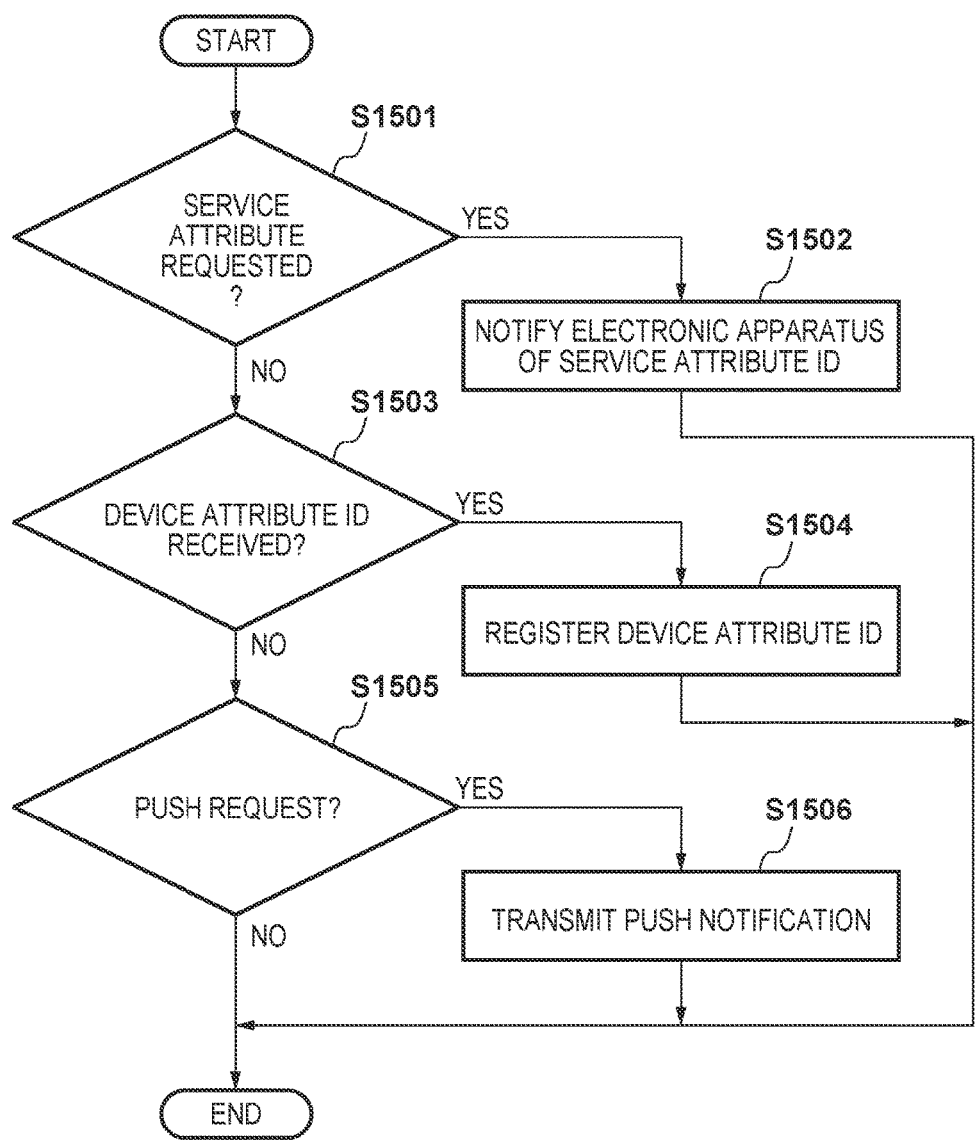

The operation of the push server 103 will now be described. FIG. 15A is a flowchart showing the operation of the push server 103. The service attribute ID transmission unit 1403 of the push server 103 receives, from an external communication apparatus, the request of a service attribute ID related to a service for the push notification (step S1501), and then transmits the service attribute ID to the request source communication apparatus (step S1502). An example of the external communication apparatus is the electronic apparatus 101 or the mobile terminal 102 described above. At this time, the push server 103 obtains the service attribute ID from the application server 104 as needed. The device attribute ID registration unit 1404 receives the device attribute ID from the external communication apparatus (step S1503), and then registers the received device attribute ID in association with the transmission destination of the push notification (a transmission source apparatus of the device attribute ID or an apparatus designated as the transmission destination) (step S1504). The push request reception unit 1405 receives a push request from the application server 104 (step S1505). Then, the push notification transmission unit 1406 transmits the push notification to a transmission destination associated with a device attribute ID (or a service attribute ID) described in the push request (step S1506).

An example of the communication sequence among the respective devices in the communication system of the device arrangement shown in FIG. 1 will now be described in detail with reference to FIG. 8. In M801, the mobile terminal 102 obtains the service attribute ID from the push server 103 (steps S701, S1501, and S1502). In M802, the service attribute ID is transmitted from the mobile terminal 102 to the electronic apparatus 101 (steps S703 and S602). In M803, the electronic apparatus 101 generates and obtains the device attribute ID by using the received service attribute ID (step S603). In M804, the device attribute ID (the device attribute ID of proxy target) is transmitted from the electronic apparatus 101 to the mobile terminal 102 (steps S604 and S704). In M805, the device attribute ID that the mobile terminal 102 receives from the electronic apparatus 101 is registered in the memory unit 403 (step S705).

In M806, the electronic apparatus 101 transmits the device attribute ID to the push server 103 directly or via the mobile terminal 102 (steps S605 to S609, and steps S706 and S707). The push server 103 registers the received device attribute ID in association with the device of the subject for push notification (steps S1503 and S1504). Note that the electronic apparatus 101 transmits, together with the device attribute ID, information that designates the mobile terminal 102 as the device of the subject for push notification (for example, the address of the mobile terminal 102). The push server 103 registers the received device attribute ID and the mobile terminal 102 in association with each other. Then, the electronic apparatus 101 transits to the power save mode and starts the wait by BLE (steps S5610 and S611). In M807, the mobile terminal 102 starts to wait for the push notification and notifies the push server 103 of this (step S709). This allows the mobile terminal 102 to receive the push notification of a service requested by itself and the push notification of a service requested by the electronic apparatus 101.

The push server 103 receives a push notification request from the application server 104 (M808). The push notification received here is a push notification to the electronic apparatus 101, that is, a push notification addressed to the device attribute ID generated by the electronic apparatus 101. In M809, the push notification addressed to the electronic apparatus 101 is transmitted from the push server 103 and received by the mobile terminal 102 (step S709). In M810, the mobile terminal 102 transmits the push notification addressed to the electronic apparatus 101 to the electronic apparatus 101, and the electronic apparatus receives this (steps S713 and S612). Consequently, the electronic apparatus 101 receives the push notification transmitted from the push server 103 to the electronic apparatus 101 via a relay by the mobile terminal 102 (relay apparatus). In M811, the electronic apparatus 101 performs display based on the received push notification (step S614).

An operation performed when the electronic apparatus 101 waits for the push notification from the push server 103 will now be described with reference to FIG. 9. As described above, the push notification reception unit 307 of the electronic apparatus 101 may wait for the push notification from the push server 103 under the predetermined condition. It is determined whether the electronic apparatus 101 operates under the predetermined condition. If it is determined that the electronic apparatus 101 does not operate under the predetermined condition, the electronic apparatus 101 receives the push notification from the push server 103 via the relay by the mobile terminal 102, as described above with reference to FIGS. 6A to 8. On the other hand, if it is determined that the electronic apparatus 101 operates under the predetermined condition, the electronic apparatus 101 waits for the push notification from the push server 103. In this case, when the device attribute ID generated by the electronic apparatus 101 is registered in the push server 103, the electronic apparatus 101 is set as a corresponding transmission destination. A process in this case will be described below with reference to FIG. 9.

Figure 9:
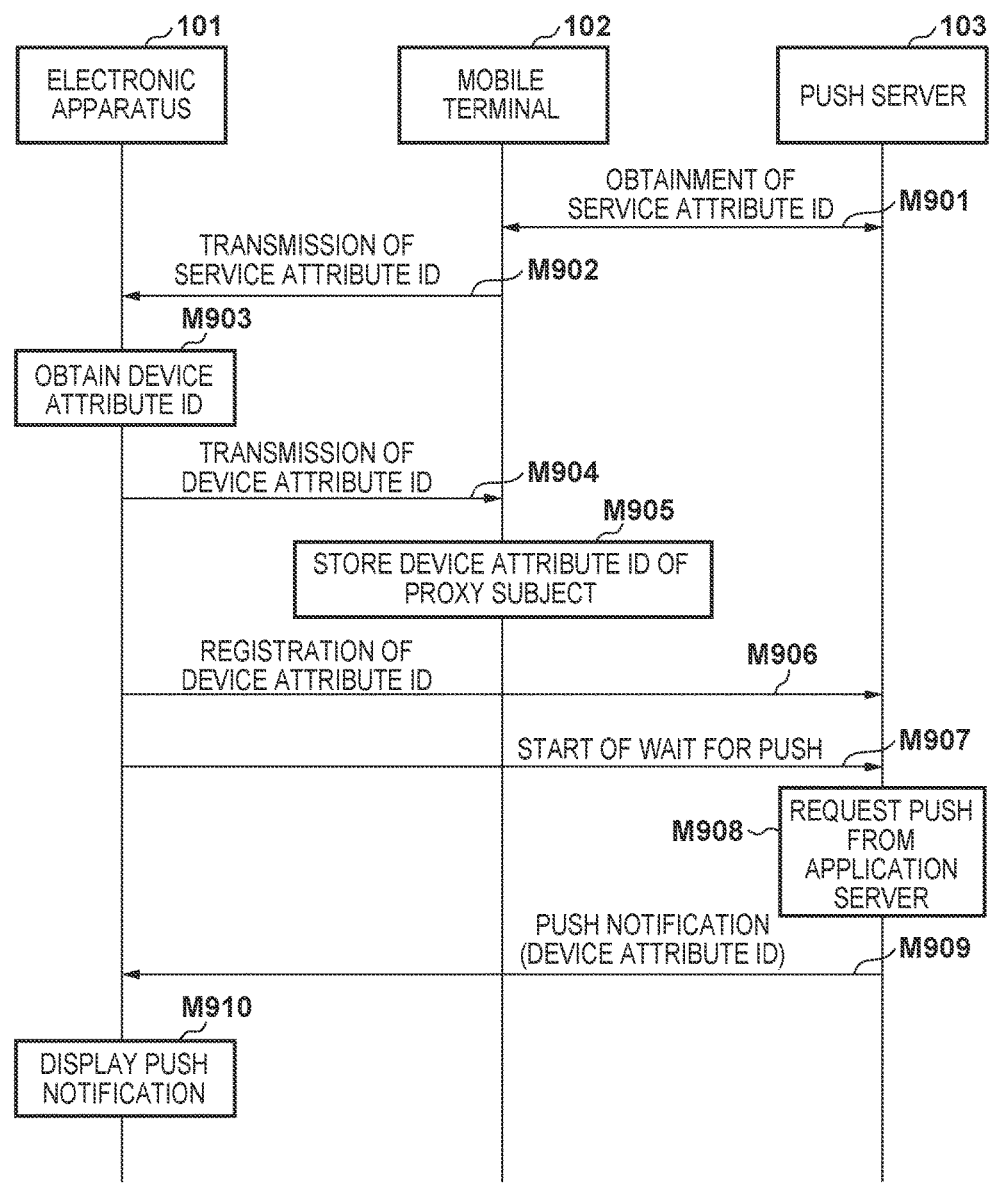
FIG. 9 is a chart showing an example of the sequence of the communication process according to the embodiment.

In FIG. 9, M901 to M906 are the same processes as M801 to M806. In M906, however, the electronic apparatus 101 is registered as the transmission destination corresponding to the device attribute ID. In M907, the push notification reception unit 307 of the electronic apparatus 101 is connected to the push server via the wireless LAN access point 105 by the wireless LAN control unit 202 and starts to wait for the push notification. The push server 103 receives the push notification request addressed to the electronic apparatus 101 from the application server 104 (M908), and then transmits the push notification to the electronic apparatus 101 (M909). The electronic apparatus 101 performs display based on the received push notification (M909) (M910). The mobile terminal 102 registers the device attribute ID received from the electronic apparatus 101 as the proxy target in M905. However, the push notification containing that device attribute ID is never transmitted from the push server 103. This is because in the push server 103, the electronic apparatus 101 is registered as the transmission destination of that device attribute ID in M907.

Figure 10:
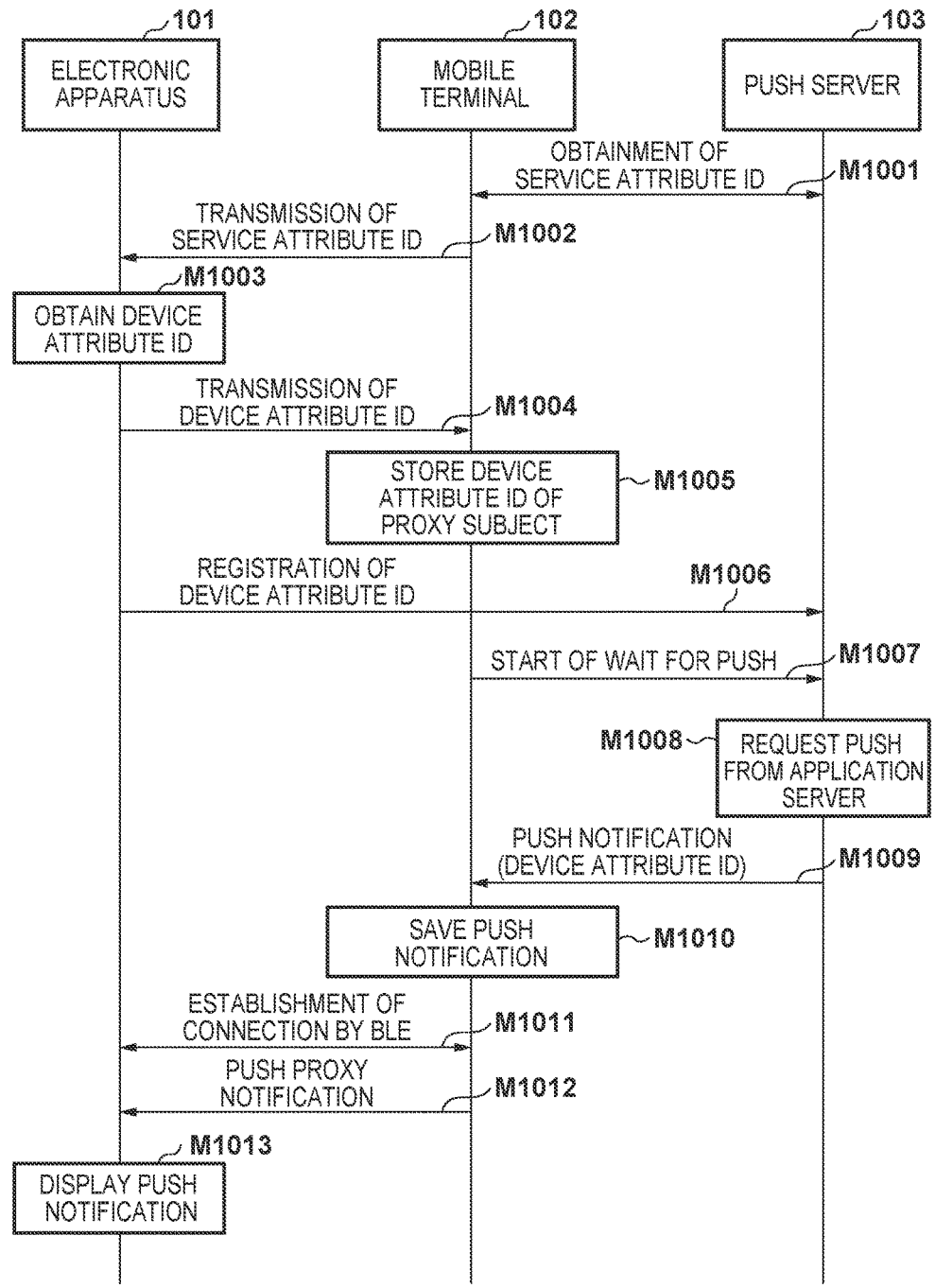
FIG. 10 is a chart showing an example of the sequence of the communication process according to the embodiment.

A sequence in a case in which the electronic apparatus 101 and the mobile terminal 102 are disconnected (NO in step S712 of FIG. 7B) when the push notification proxy transmission unit 509 transmits the push proxy notification will be described with reference to FIG. 10. M1001 to M1009 are the same processes as M801 to M809. If BLE connection with the electronic apparatus 101 is not established when the push notification reception unit 507 of the mobile terminal 102 receives the push notification addressed to the electronic apparatus 101 from the push server 103 (M1009), that push notification is saved (M1010). This process is performed in the order of step S710 (YES), step S712 (NO), and step S714. Then, once connection by BLE is established between the electronic apparatus 101 and the mobile terminal 102 (M1011), the mobile terminal 102 transmits the push notification saved in M1010 to the electronic apparatus 101 via BLE (M1012). M1013 is the same as M811.

As described above, according to the first embodiment, it becomes possible for the electronic apparatus 101 to receive the push notification from the mobile terminal 102 that can be connected to the network all the time. This allows the electronic apparatus 101 to receive the push notification via the mobile terminal 102 only by wirelessly connecting the electronic apparatus 101 and the mobile terminal 102 in a power save state. It is therefore possible to save more power than in a case in which the electronic apparatus 101 directly waits for the push notification from the push server 103 all the time.

In addition, there is an effect of allowing the mobile terminal 102 connected to the public wireless network to receive the push notification by proxy even if there is no wireless LAN access point around the electronic apparatus 101. That is, according to the above-described embodiment, if there is no wireless LAN access point around the electronic apparatus 101, the mobile terminal 102 is requested to transmit the device attribute ID. As a result, it becomes possible to receive the push notification via the mobile terminal 102 regardless of the presence/absence of the access point around the electronic apparatus 101.

Further, in this embodiment, the mobile terminal 102 transmits the push notification after finding the device (electronic apparatus 101) of the subject for push notification by saving the push notification when there is no connection to the device of the subject. As a result, even if the electronic apparatus 101 is at a distance away from the mobile terminal 102, the electronic apparatus 101 can receive the push notification addressed to itself later by bringing the mobile terminal 102 closer to the electronic apparatus 101. For example, it becomes possible to transmit, to a printer (electronic apparatus 101) inside home, and print a printed product received by the mobile terminal 102 outside home upon the push notification addressed to the printer serving as the electronic apparatus 101.

Second Embodiment

Figure 11:
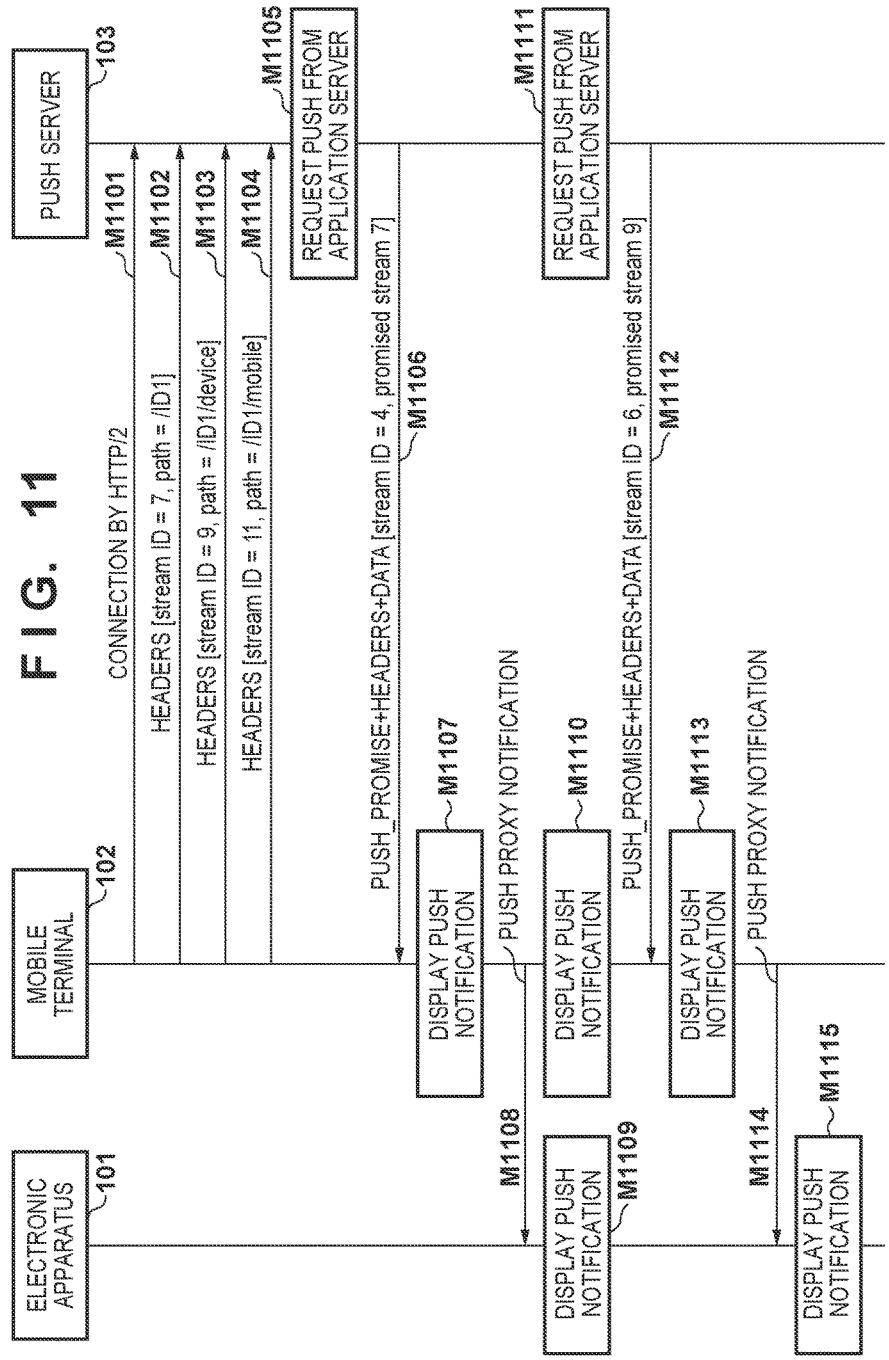
FIG. 11 is a chart showing an example of the sequence of a communication process according to an embodiment.

In the second embodiment, a method of waiting for a push notification by using HTTP/2 will be described in detail with reference to FIG. 11. Note that in the second embodiment, a service attribute ID "ID1" setting an electronic apparatus 101 and a mobile terminal 102 as subjects for push notification,
"ID1/device" as a device attribute ID setting the electronic apparatus 101 as the subject for push notification, and
"ID1/mobile" as a device attribute ID setting the mobile terminal 102 as the subject for push notification
are stored in a push server 103.

A push notification reception unit 507 is connected to the push server 103 by HTTP/2 (M1101). Then, the push notification reception unit 507 transmits a HEADERS frame and creates a stream in order to receive a push notification to the service attribute ID "ID1" (M1102). In M1102, an HTTP path is designated as "/ID1" to create the stream. As described above, in the second embodiment, the push notification can be registered by the service attribute ID. Then, the push notification reception unit 507 transmits a HEADERS frame and creates a stream in order to receive a push notification to the device attribute ID "ID1/device" (M1103). In M1103, an HTTP path is designated as "/ID1/ device" to create the stream. Then, the push notification reception unit 507 transmits a HEADERS frame and creates a stream in order to receive a push notification to the device attribute ID "ID1/mobile" (M1104). In M1104, an HTTP path is designated as "/ID1/mobile" to create the stream. M1101 to M1104 above correspond to the process in step S707 of FIG. 7A.

In this embodiment, a transmission path of the push notification is formed (a stream available for the push notification is created) by transmitting a HEADERS frame and creating a stream when an apparatus that receives the push notification registers the device attribute ID in the push server 103. Therefore, when the mobile terminal 102 relays (by proxy) the push notification, the device attribute ID needs to be registered (the HEADERS frame needs to be transmitted) from the mobile terminal 102. That is, when the mobile terminal 102 receives the push notification by proxy, the electronic apparatus 101 performs step S606 of FIG. 6B to cause the mobile terminal 102 to register the device attribute ID by proxy.

The push server 103 receives a push request to the service attribute ID "ID1" from an application server 104 (M1105 and step S1505). The push server 103 obtains a stream which is associated with a stream ID registered in correspondence with identification information (a device attribute ID or a service attribute ID) designated by a push notification of a subject for transmission in the push request. Then, the push server 103 transmits the push notification of the subject for transmission by using the obtained stream. For example, the push server 103 transmits the push notification to the mobile terminal 102 which waits for the push notification to the service attribute ID "D1". In this case, the push server 103 transmits a PUSH_PROMISE frame to the mobile terminal 102 in order to create a stream associated with the stream created in M1102 (M1106 and step S1506). Subsequently, the HEADERS frame and a DATA frame are transmitted. In this embodiment, the PUSH_PROMISE frame is sent when the push notification is transmitted. However, the PUSH_PROMISE frame may be transmitted in advance. In this case, the push notification is sent as the HEADERS frame and the DATA frame.

The push notification reception unit 507 receives the push notification (M1107). Note that the push notification reception unit 507 can judge that the received push notification is associated with the service attribute ID "ID1" by checking a stream ID associated with a stream that has received the push notification. For example, for the frame transmitted in M1106, the stream ID (promised stream) associated with the stream ID that has received the push notification is 7. Since the path of the HEADERS frame (the frame transmitted in M1102) with the steam ID of 7 is /ID1, it is judged that the received push notification is associated with the service attribute ID "D1". When only the service attribute ID is designated, a push notification proxy transmission unit 509 judges the match of the device attribute ID even when the service attribute ID that matches the device attribute ID is contained (step S710). As a result, the push notification proxy transmission unit 509 transmits the push notification received in M1107 to the electronic apparatus 101 (M1108).

A display processing unit 305 of the electronic apparatus 101 displays a message on a display unit 207 (M1109). In this example, "ID1/mobile" is set as the device attribute ID of the mobile terminal 102, which has the matched service attribute ID. Therefore, the push notification received in M1107 is also treated as being addressed to the mobile terminal 102. Hence, a display processing unit 505 of the mobile terminal 102 displays a message corresponding to the push notification on a display unit 407 (M1110).

Then, the push server 103 receives, from the application server 104, a push request which sets "ID1/device" as a subject of notification (M1111). The push server 103 creates a stream associated with the stream which sets "ID1/device" as the subject (the HEADERS frame received in M1103) in the PUSH_PROMISE frame and transmits the push notification (M1112). The push notification reception unit 507 receives the push notification (M1113).

The mobile terminal 102 which receives the push notification in M1113 recognizes that a stream ID (promised stream) associated with the stream ID is 9. Since the promised stream is 9, the mobile terminal 102 judges that the received push notification sets the device attribute ID="ID1/device" as the subject for notification. In this case, the push notification concerned matches a device attribute ID stored in a memory unit 403. Accordingly, a push proxy notification is transmitted to the electronic apparatus 101 (M1114 and steps S710, S712, and S713). Meanwhile, this push notification does not set the mobile terminal 102 as a subject for notification, and thus a process based on the push notification is not performed in the mobile terminal 102. The display processing unit 305 performs push notification display based on the received push proxy notification on the display unit 207 (M1115 and step S614).

As described above, in the second embodiment, the device attribute ID and the service attribute ID are managed in association with the HTTP path. As a result, when the wait for the push notification is started, it can be started without giving unnecessary data. As a result, it is possible to reduce the processing load of the network and the processing load of the electronic apparatus 101.

Third Embodiment

Figure 12:
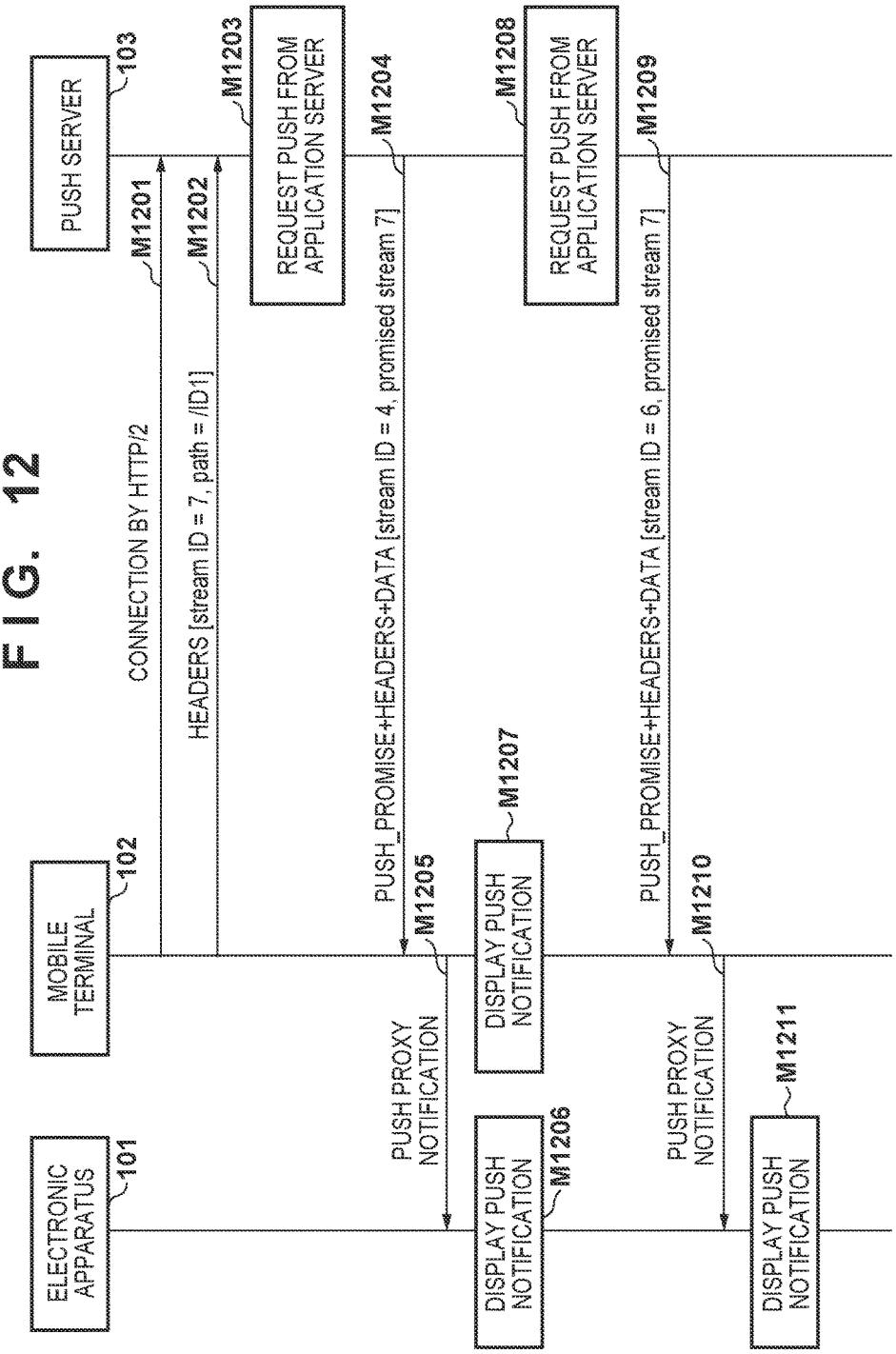
FIG. 12 is a chart showing an example of the sequence of a communication process according to an embodiment.

A method of waiting for a push notification by using HTTP/2 will be described in detail with reference to FIGS. 12 and 13. Note that also in the third embodiment, a description will be made assuming that a service attribute ID "ID1" setting an electronic apparatus 101 and a mobile terminal 102 as subjects for push notification, a device attribute ID "ID1/device" setting the electronic apparatus 101 as the subject for push notification, and a device attribute ID "ID1/mobile" setting the mobile terminal 102 as the subject for push notification are stored in a push server 103.

FIG. 15B is a flowchart showing a detail of the operation of the push server 103 in step S1506 (FIG. 15A) according to the third embodiment. The push server 103 determines whether a push request received from an application server 104 designates a device attribute ID (step S1511). If the push server 103 determines that the push request designates the device attribute ID, the push server 103 transmits a push notification by utilizing a wait corresponding to that device attribute ID (steps S1512 and S1514). If there is no wait corresponding to the device attribute ID, the push server 103 transmits the push notification by utilizing a wait corresponding to the service attribute ID contained in the designated device attribute ID (steps S1513 and S1514). Note that the wait corresponding to the service attribute ID defines the service attribute ID as recognition information but does not define a device serving as the subject for notification. At this time, the device attribute ID designated by the push request is described in a push notification stream. If there is no wait corresponding to the service attribute ID contained in the device attribute ID, the push server 103 saves or discards the push notification (step S1515). Note that the wait corresponding to the device attribute ID or the service attribute ID is, for example, a stream created by using a HEADERS frame in which the device attribute ID or the service attribute ID is described as an HTTP path in HTTP/2.

On the other hand, if the push request designates the service attribute ID and does not define the subject for notification, the push server 103 transmits the push notification by utilizing the wait corresponding to that service attribute ID (steps S1521 and S1523). If there is no wait corresponding to the service attribute ID, the push notification is transmitted by utilizing a wait corresponding to a device attribute ID which contains that service attribute ID (steps S1522 and S1523). If there is no device attribute ID concerned, that push notification is saved or discarded (steps S1524).

The method of waiting for the push notification by using HTTP/2 according to the third embodiment will be described below in detail with reference to FIG. 12. In FIG. 12, a case will be described in which a wait for the service attribute ID is registered in the push server 103, but a wait for the device attribute ID is not registered in the push server 103. A push notification reception unit 507 is connected to the push server 103 by HTTP/2 (M1201). Then, the push notification reception unit 507 transmits the HEADERS frame and creates a stream in order to receive the push notification to the service attribute ID "ID1" (M1202). In M1202, the HTTP path is designated as "/ID1" to create the stream. In this example, only a wait for the service attribute ID "ID1" is set.

Then, the push server 103 receives, from the application server 104, a push request to the service attribute ID "ID1" (M1203). The push server 103 transmits the push notification to a stream which waits for the service attribute ID "ID1" (M1204, and steps S1521 and S1523). M1205 to M1207 are the same as M1108 to M1110 of FIG. 11.

Next, the push server 103 receives the push request to the device attribute ID "ID1/device" (M1208). The push server 103 confirms that there is no stream which waits for the device attribute ID "ID1/device". Then, since there exists the stream which waits for the service attribute ID "ID1", the push server 103 transmits the push notification to that stream (M1209, and steps S1513 and S1514). That is, if there exists no stream which waits for the device attribute ID, the push server 103 searches for the stream which waits for the service attribute ID. In this case, the push server 103 sets the description of the device attribute ID in the push notification (step S1511 (device attribute ID)→step S1512 (NO)→step S1513 (YES)→step S1514). If the received push notification includes the description of the device attribute ID, the push notification reception unit 507 of the mobile terminal 102 processes the push notification in accordance with the described device attribute ID. The device attribute ID "ID1/device" is described in the push notification transmitted in M1209, and thus the mobile terminal 102 transmits a push proxy notification to the electronic apparatus 101 (M1210). A display processing unit 305 of the electronic apparatus 101 displays a message on a display unit 207 (M1211).

A case in which there is the wait for the push notification to the device attribute ID will now be described in detail with reference to FIG. 13. Note that a case is shown in FIG. 13 in which the electronic apparatus 101 operates under the predetermined condition and proxy reception of the push notification is not activated, as described in the first embodiment.

Figure 13:
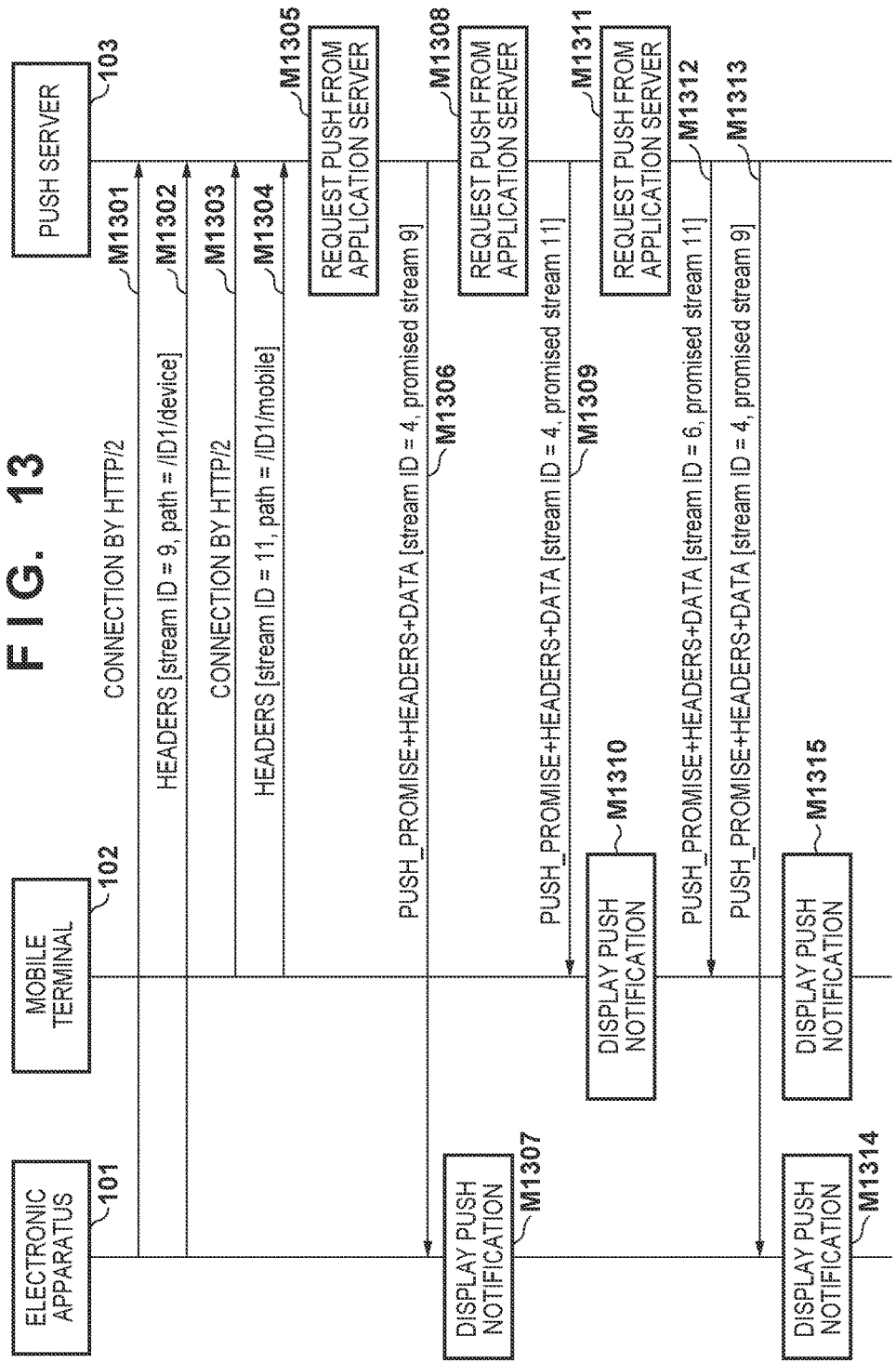
FIG. 13 is a chart showing an example of the sequence of the communication process according to the embodiment.

In FIG. 13, a push notification reception unit 307 of the electronic apparatus 101 is connected to the push server 103 by HTTP/2 (M1301). Then, the push notification reception unit 307 transmits a HEADERS frame and creates a stream in order to receive the push notification addressed to the device attribute ID "ID1/device" (M1302). In M1302, the stream is created in which an HTTP path is designated as "/ID1/device". The push notification reception unit 507 of the mobile terminal 102 is connected to the push server 103 by HTTP/2 (M1303). Then, the push notification reception unit 507 transmits a HEADERS frame and creates a stream in order to receive the push notification addressed to the device attribute ID "ID1/mobile" (M1304). In M1304, the stream is created in which an HTTP path is designated as "/ID1/mobile".

The push server 103 receives a push request to the device attribute ID "ID1/device" (M1305). There is the wait for the push notification to the device attribute ID "ID1/device", and thus the push server 103 transmits the push notification by using this wait (M1306, and steps S1512 and S1514). The electronic apparatus 101 receives the transmitted push notification. The electronic apparatus 101 that has received this push notification performs display corresponding to the push notification (M1307).

The push server 103 also receives a push request to the device attribute ID "ID1/mobile" (M1308). There is the wait for the push notification to the device attribute ID "ID1/mobile", and thus the push server 103 transmits the push notification by using this wait (M1309, and steps S1512 and S1514). The mobile terminal 102 receives the transmitted push notification. The mobile terminal 102 that has received this push notification performs display corresponding to the push notification (M1310).

Then, the push server 103 receives a push request to the service attribute ID "ID1" (M1311). First, the push server 103 confirms that there is no wait for the push notification to the service attribute ID "D1". Then, there are the waits for the push notifications to the device attribute ID "ID1/device" and the device attribute ID "ID1/mobile", and thus the push server 103 transmits the push notifications to them (M1312, M1313, and steps S1522 and S1523). Each of the electronic apparatus 101 and the mobile terminal 102 receives the push notification and performs display corresponding to the push notification (M1314 and M1315).

Note that if a predetermined condition is not set such which the electronic apparatus 101 waits for the push notification from the push server 103, the mobile terminal 102 performs relay (by proxy). In this case, in M1301 and M1302, the mobile terminal 102 and the push server 103 are connected to each other by HTTP/2, and the HEADERS frame is transmitted from the mobile terminal 102 to the push server 103. In M1306, the mobile terminal 102 receives the push notification (PUSH_PROMISE frame), and the push proxy notification to the electronic apparatus 101 is performed in accordance with the device attribute ID. Similarly, also in M1313, the mobile terminal 102 receives the push notification, and the push proxy notification to the electronic apparatus 101 is performed in accordance with the device attribute ID.

As described above, in the third embodiment, the device attribute ID and the service attribute ID are associated with the HTTP path, and further given the parent-child relationship. As a result, it is possible to reduce the number of streams to be created when the wait for the push notification is started. As a result, it is also possible to reduce the processing load of the network and the processing load of the electronic apparatus 101.

As described above, according to the above-described embodiment, the communication apparatus need not maintain connection all the time by requesting another device to receive the push notification by proxy. As a result, it is possible to reduce power consumption of the communication apparatus. When the present invention is applied to a communication incorporated device such as a camera, an effect of making a wait time for the push notification longer is obtained.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-133927, filed Jul. 2, 2015 which is hereby incorporated by reference herein in its entirety.

What is claimed is:

1. A communication apparatus comprising:
a first transmission unit configured to transmit, to a relay apparatus, identification information for identifying a push message to be transmitted to the communication apparatus;
a registration unit configured to register the relay apparatus as a transmission destination of a push message identified by the identification information, in a server apparatus serving as a transmission source of a push message;
a reception unit configured to receive, from the relay apparatus, a push message transmitted by the relay apparatus after the first transmission unit transmits the identification information to the relay apparatus; and
a control unit configured to perform a process for switching an operation mode of the communication apparatus from a first operation mode to a second operation mode lower in power consumption than the first operation mode after the first transmission unit transmits the identification information to the relay apparatus.

2. The communication apparatus according to claim 1, wherein the registration unit transmits the identification information and information designating the relay device as a transmission destination of the push message to the server apparatus by using a second communication unit different in at least a communication protocol from a first communication unit used by the first transmission unit to transmit the identification information.

3. The communication apparatus according to claim 1, wherein the registration unit transmits a message, which requests to transmit the identification information and information designating the relay device as a transmission destination of the push message to the server apparatus, to the relay apparatus by using the first transmission unit.

4. The communication apparatus according to claim 1, wherein the control unit changes the communication apparatus from the second operation mode to the first operation mode when the reception unit receives the push message.

5. A control method of a communication apparatus comprising:
transmitting, to a relay apparatus, identification information for identifying a push message to be transmitted to the communication apparatus by using a first transmission unit;
registering, in a server apparatus serving as a transmission source of a push message, the relay apparatus as a transmission destination of a push message identified by the identification information;
receiving, from the relay apparatus, a push message transmitted by the relay apparatus after the first transmission unit transmits the identification information to the relay apparatus; and
performing a process for switching an operation mode of the communication apparatus from a first operation mode to a second operation mode lower in power consumption than the first operation mode after the first transmission unit transmits the identification information to the relay apparatus.

6. The apparatus according to claim 2, wherein, in the second operation mode, electric power is supplied to the first communication unit and electric power is not supplied to the second communication unit.

7. The apparatus according to claim 2, wherein the first communication unit performs short distance wireless communication.

* * * * *